(12) United States Patent
Thun-Hohenstein et al.

(10) Patent No.: US 12,535,589 B2
(45) Date of Patent: Jan. 27, 2026

(54) IMAGING SENSOR

(71) Applicant: IRIS-GMBH INFRARED & INTELLIGENT SENSORS, Berlin (DE)

(72) Inventors: Andreas Thun-Hohenstein, Berlin (DE); Harald Leder, Berlin (DE); Wilfried Lothar Wagner, Berlin (DE)

(73) Assignee: IRIS-GMBH INFRARED & INTELLIGENT SENSORS, Berlin (DE)

( * ) Notice: Subject to any disclaimer, the term of this patent is extended or adjusted under 35 U.S.C. 154(b) by 1333 days.

(21) Appl. No.: 17/282,084

(22) PCT Filed: Oct. 4, 2019

(86) PCT No.: PCT/EP2019/076963
§ 371 (c)(1),
(2) Date: Jun. 1, 2021

(87) PCT Pub. No.: WO2020/070311
PCT Pub. Date: Apr. 9, 2020

(65) Prior Publication Data
US 2021/0373164 A1      Dec. 2, 2021

(30) Foreign Application Priority Data

Oct. 4, 2018 (DE) .................... 10 2018 124 551.3
Sep. 12, 2019 (DE) .................... 10 2019 124 573.7

(51) Int. Cl.
*G01S 17/894*    (2020.01)
*G01S 7/48*       (2006.01)
(Continued)

(52) U.S. Cl.
CPC .......... *G01S 17/894* (2020.01); *G01S 7/4808* (2013.01); *G01S 7/4865* (2013.01); *G01S 7/497* (2013.01); *H04N 25/78* (2023.01)

(58) Field of Classification Search
CPC ........ G01S 17/894; G01S 7/497; G01S 17/10; H04N 25/75; H04N 25/78
See application file for complete search history.

(56) References Cited

U.S. PATENT DOCUMENTS 7,242,478 B1    7/2007  Dombrowski et al.
11,086,013 B2 *  8/2021  Pacala .................. H04B 10/503
(Continued)

FOREIGN PATENT DOCUMENTS

CN    108463995 A    8/2018
EP    3182162 A1    6/2017
(Continued)

OTHER PUBLICATIONS

International Search Report and Written Opinion from PCT/EP2019/076963, Jan. 20, 2020 (14 pages).
(Continued)

*Primary Examiner* — Isam A Alsomiri
*Assistant Examiner* — Joseph C Fritchman
(74) *Attorney, Agent, or Firm* — Francis J. Maguire; WARE FRESSOLA MAGUIRE & BARBER LLP

(57) ABSTRACT

The invention relates to imaging 3-D time-of-flight sensors that are particularly suitable for the detection of objects and individuals in three-dimensional space. This capability results from the basic principle. In each image point of the sensor, the distance to the object located in the observation space is determined by using the propagation time (time of flight) of light pulses. The sensor therefore supplies a three-dimensional image, which can be analyzed by means of suitable processing algorithms. In specific applications, in (Continued)

particular in the interaction of human and machine, machine and machine, or machine and space, it is necessary that the detection is carried out safely. The level of safety is classified in various standards into safety integrity levels.

14 Claims, 26 Drawing Sheets

(51) Int. Cl.
  *G01S 7/4865* (2020.01)
  *G01S 7/497* (2006.01)
  *H04N 25/78* (2023.01)

(56) References Cited

U.S. PATENT DOCUMENTS

| | | | | |
|---|---|---|---|---|
| 2007/0280505 | A1* | 12/2007 | Breed | B60W 40/08 382/104 |
| 2008/0186470 | A1 | 8/2008 | Hipp | |
| 2013/0088656 | A1* | 4/2013 | Michihata | G02B 26/001 359/291 |
| 2014/0267859 | A1* | 9/2014 | Wang | H04N 25/77 348/308 |
| 2016/0057347 | A1* | 2/2016 | Gleason | G03B 13/36 348/220.1 |
| 2017/0099439 | A1* | 4/2017 | Pulli | H04N 23/951 |
| 2017/0176250 | A1 | 6/2017 | Rae et al. | |
| 2017/0257617 | A1 | 9/2017 | Retterath | |
| 2018/0059224 | A1 | 3/2018 | Wang et al. | |
| 2018/0213170 | A1* | 7/2018 | Segawa | G02B 5/30 |
| 2018/0295301 | A1* | 10/2018 | Lee | H04N 25/7795 |
| 2019/0302246 | A1* | 10/2019 | Donovan | G01S 7/4863 |
| 2020/0073355 | A1* | 3/2020 | Veryha | G06F 13/4004 |

FOREIGN PATENT DOCUMENTS

| | | |
|---|---|---|
| JP | 2008145348 A | 6/2008 |
| JP | 2010256291 A | 11/2010 |
| JP | 2018077122 A | 5/2018 |
| WO | 2017050633 | 3/2017 |
| WO | 2017050633 A1 | 3/2017 |
| WO | 2018172767 A1 | 9/2018 |

OTHER PUBLICATIONS

Chinese Office Action, Application No. 201980080136.9, Oct. 31, 2023 (36 pages).

Japanese Office Action, Application No. 2021-518588, Aug. 8, 2023 (20 pages).

Sumida Hiroyuki, "fifth Part 7. Safety Instrumentation System", Production Site Information Management Handbook [ISBN : 4 to 7693], [7130] to [6], Nov. 25, 2004, First Edition, First Printing, pp. 637 to 646.

Lange, Robert: "3D Time-of-Flight Distance Measurement with Custom Solid-State Image Sensors in CMOS/CCD-Technology", Department of Electrical Engineering and Computer Science at University of Siegen, Jun. 28, 2000, 223 pages.

Chinese Office Action, Application No. 201980080136.9, Jul. 31, 2024 (35 pages).

* cited by examiner

IMAGING SENSOR

CROSS-REFERENCE TO RELATED APPLICATIONS

The present application is a U.S. National Stage Entry of International Application PCT/EP2019/076963 filed Oct. 4, 2019, which claims priority to German Patent Application Nos. 10 2018 124 551.3 filed Oct. 4, 2018 and 10 2019 124 573.7 filed Sep. 12, 2019, which are incorporated by reference in their entireties.

BACKGROUND OF THE DISCLOSURE 3D time-of-flight image sensors (TOF sensors) are particularly suitable for the detection of objects and people in a three-dimensional space. This ability results from the basic principle. In each image point of the sensor, the distance to the objects located in the detection area of the sensor is determined based on the transit time (also referred to as time of flight (tof)) of light pulses' The sensor thus supplies a sensor output signal that reflects a data set containing a distance value for each image point (also referred to as a pixel) of the sensor that corresponds to the distance between the respective image point and the section of the object surface mapped onto this image point. The sensor thus provides a three-dimensional image that can be analyzed using appropriate processing algorithms. It is a known fact, for example, that the sensor output signal is analyzed in order to determine whether objects are located within a predetermined spatial sector. In certain applications, one or more 3D time-of-flight image sensors can be used to detect whether a person and a machine part come dangerously close to each other e. g. in the activity area of the machine. In certain applications, in particular concerning the interaction between man and machine, machine and machine, or machine and space, it is necessary that the detection be performed extremely reliably, i. e. safely (safe).

The level of safety is classified as safety integrity levels (SIL) in various standards:

| | | | | | |
|---|---|---|---|---|---|
| Automobile (ISO 26262) | QM | ASIL-A | ASIL-B/C | ASIL-D | — |
| General (IEC-61508) | — | SIL-1 | SIL-2 | SIL-3 | SIL-4 |
| Aviation (DO-178/254) | DAL-E | DAL-D | DAL-C | DAL-B | DAL-A |
| Railway (CENELEC 50126/128/129) | — | SIL-1 | SIL-2 | SIL-3 | SIL-4 |

STATE OF THE ART

3D TOF sensors are known that have at least one optical transmitter for emitting electromagnetic radiation, preferably (but not exclusively) in the near infrared range, and an image sensor that is composed of an arrangement of radiation receivers. Each individual radiation receiver equals one pixel (image point) of the image sensor and thus of the 3D TOF sensor.

The radiation receivers are typically divided into two groups (radiation receiver A, radiation receiver B) and arranged as a matrix.

Each radiation receiver has a photosensitive element (e. g. a photodiode or a photo gate) and at least one memory capacity.

A typical mode of operation of a TOF sensor is as follows:

At a point in time t0, the transmitter is activated and then emits a light pulse for a short period of time ti (e. g. 30 ns) with a light pulse duration corresponding to ti. At the same time, the radiation receiver A is also activated for a short activation period tA (e. g. also 30 ns). The light pulse is reflected on an object, and the radiation receiver A registers it offset by the time of flight tof. During the activation period tA, the energy of the reflected light pulse causes charges—namely photoelectrons—to be released in the photosensitive element. The charge as a result of registration of the light pulse (corresponding to the number of released photoelectrons) is stored on the storage capacity (A1). The receiver A can only receive that part of the reflected light pulse which corresponds to the time difference tA-tof, since the impingement of the reflected light pulse on the photosensitive element is delayed by the time of flight tof as compared to the start of the activation period, and the activation period and the pulse duration of the reflected light pulse only partially overlap temporally for an overlap period. The duration of the overlap is inversely proportional to the transit time or time of flight of the light pulse (see FIG. 1). Correspondingly, the number of released photoelectrons is at least approximately inversely proportional to the transit time or time of flight of the light pulse.

The radiation receiver B is activated with a time delay $\Delta = t0+tA$ (again 30 ns in the example), i. e. directly after completion of the first activation period tA. The radiation receiver B is active for a second activation period tB (also 30 ns in the example). Again, the receiver only registers part of the reflected light pulse, which corresponds to the time difference $\Delta = tof+ti-tA$ (if ti=tA, this is tof) and is thus proportional to this time difference (the transit time or time of flight of the light pulse). The corresponding charge quantity is stored on the storage capacity B1.

Since the reflected signals can be very weak depending on the reflectance of the reflecting object and the distance, it is necessary to provide an amplification mechanism. This is achieved by repeating the measurement described above many times, thereby accumulating the respectively registered charge quantity on the storage capacity until a sufficient signal level is reached.

The distance can be calculated as follows:

$$E1 = P(R) * k\text{ref} * (T-\text{tof})$$

$$E2 = P(R) * k\text{ref} * (\text{tof}+T-T) = P(R) * k\text{ref} * \text{tof}$$

where:

E1; E2—energies per scanning for receiver A or B

T=tA=tB=ti—max. time of flight=30 ns for a maximum distance of 4.5 m (uniqueness range)

kref—reflection coefficient of the target tof—time of flight of the pulse

P(R)—reflected pulse power at kref=1

P(R)—reflected pulse power at kref=1.

The charge quantities are proportional to the respective energy values per scanning process.

In simplified terms, the following could be written for 200 accumulations:

With $$A = p\sum_{n=1}^{200} pE_1$$

$$B = \sum_{n=1}^{200} pE_2$$

A; B—charge quantities accumulated in storage capacity A resp. B p—is the proportionality factor; its specific properties are not relevant for these considerations.

By way of scaling (division by the sum of the charge quantities accumulated in the two capacities), normalized charge quantities Q1 and Q2 that are not dependent on the reflectance can be formed.

Q1=A/(A+B)(elimination of the dependence on the degree of reflectance through formation of quotients)

Q2=B/(A+B)

a value for the time of flight can be generated from the normalized charge quantity for each capacity:

tof1=(1−Q1)×T tof2=Q2×T

In the ideal error-free case, the two times of flight tof1 and tof2 determined in this way are identical: tof 1=tof 2. Possible measurement errors can be reduced by way of averaging:

tof=½(tof 1+tof2)(average)

The measured distance between the sensor and the reflecting object results in:

S=½(c*tof)c—speed of light

An extended variant of the described structure is one in which each receiver has two storage capacities (receiver A via Aa and Ab; receiver B via Ba and Bb). This property results in additional functions.

First Option:

The receivers A and B are operated identically. The storage capacities Aa and Ab are switched in an offset manner—Ab takes over the function of B (as described above).

Instead of two photo receivers, only one photo receiver with two storage capacities is used:

$$Aa = \sum_{n=1}^{200} pE_1$$

$$Ab = \sum_{n=1}^{200} pE_2$$

If a suitable structure is used, the advantage of this type of arrangement can be a higher density of the receivers (better resolution).

Second Option:

The additional storage capacities are used for 4-phase scanning of the signal. While FIG. 1 describes signal scanning with two integration periods (2 phases), the signal can now be scanned four times, with the scanning points being offset by ¼ of the signal period; see FIG. 2. Periodic pulse sequences with a cycle duration T can also be used as the transmitted signal for the embodiment version.

The phase shift φ of the reflected signal caused by the time of flight tof can be calculated as follows using the charge quantities Aa, Ab, Ba and Bb accumulated in the capacities:

$$\varphi = \tan^{-1}\frac{Aa - Ab}{Ba - Bb}$$

Strictly speaking, calculation of the phase angle only applies to sinusoidal signals.

The phase shift φ can then be used to calculate the distance S between the sensor and the reflecting object:

$$S = \frac{\varphi * T}{2\pi}$$

T—is the period of the periodic signal in this case.

The relationships shown for the second option also apply if a sinusoidal form is selected as the periodic signal.

The specific application and the system design of the TOF sensor will largely determine which method is appropriate.

While the method described in FIG. 1 is generally used with very powerful pulses and a very small duty factor (e. g. >25 W pulse power; 1:1000), the pulse sequences shown in FIG. 2 or those with a duty factor of 1:1 are used for outputs of 1 W to 4 W of pulse power. A similar procedure is used when choosing the peak power for the sinusoidal modulation of the light source. It is necessary to observe the limitation of the applied power by adhering to the requirements for eye safety.

Use of Active Pixel Sensors (APS)

What is known is that an active pixel sensor (APS) needs to be provided for each pixel. An active pixel sensor typically has a photodiode and several (field effect) transistors. Light impinging on the photodiode releases charges in the barrier layer of the photodiode so that the (reverse) voltage across the diode decreases as a result of the incident photons. An active pixel sensor is operated as follows: At the beginning of the activation period, the voltage across the photodiode is set to a defined initial value by means of the reset transistor. During the activation period, the junction capacitance of the photodiode is discharged by the photocurrent caused by the incident reflected light pulse. The voltage across the photodiode drops proportionally to the intensity of the reflected light pulse and to the duration of that part of the light pulse which falls within the activation period of the active pixel sensor. At the end of the activation period, the voltage value of the voltage drop across the photodiode is read out and transmitted to analog post-processing or immediately to an analog-to-digital converter (ADC). For this purpose, each image element has an amplifier transistor which, by means of the selection transistor, is usually switched in columns to a read-out line common to all image elements in a row. Active pixel sensors can be implemented in CMOS (Complementary Metal Oxide Semiconductor) technology. Since charges in the barrier layer of the photodiode can also be released by thermal processes, for example, there is typically a signal noise that superposes the actual photo signal.

Correlated Dual Sampling (CDS)

To reduce the signal noise mentioned, it is known to measure the voltage across the photodiode not only once at the end of the activation period, but then again following the resetting of the photodiode to restore the full reverse voltage (dark voltage) in order to obtain a reference signal that can compensate the noise signal components at least partially.

Sensors that implement such correlated dual sampling have a corresponding circuit for each pixel, which is referred to as the CDS step here. The CDS step can be implemented by means of operational amplifiers, for example.

Components of a Pixel

A pixel of an image sensor can have the following components:
- an active pixel sensor (also referred to as an APS cell here),
- a CDS step that is assigned to the APS cell, and
- a sample-and-hold stage (S&H) for reading the pixel.

SUMMARY OF THE DISCLOSURE

The object of the present invention is to design the structure of a TOF sensor described above in such a way that a dangerous failure is very unlikely and can preferably only occur with a probability of less than 1 in 1100 years (SIL3 or Cat 4, PL e pursuant to ISO 13849-1).

To achieve this object, the application proposes a 3D TOF with at least one pixel matrix that has a pixel structure divided into at least two signal paths (channels A and B), wherein the signal paths are routed in such a way that the signal transit times are identical for both channels in accordance with the pixel location (H tree), and wherein each signal path has its own independent analog signal output (signal A and signal B), and wherein the 3D TOF sensor additionally has at least two optical transmitter groups, with each transmitter group comprising at least one transmitter.

The transmitters are preferably designed to emit in infrared light so that they operate in the infrared spectral range of light.

A separate logic is preferably provided for each signal path of the pixel matrix (logic of the signal path A and the signal path B) for the control. The logic of each signal path is preferably designed to determine amplitudes and distance values through processing of the signal values of both channels by exchanging the channel data crosswise.

According to a first variant of the application, the optically sensitive surfaces of the pixels of the first channel (pixel A) and the pixels of the second channel (pixel B) are optically connected in such a way that both pixels always absorb the same amount of light.

The optically sensitive surfaces of the pixels of the first channel (pixels A) and the pixels of the second channel (pixels B) can be connected by means of a diffuser that distributes the amount of light evenly across the optical surfaces of one pixel each from channel A (pixels A) and of one pixel from channel B (pixels B). This method is referred to as optical binning here. In this case, the signal paths of the pixel groups each comprising one pixel A and one pixel B are not electrically connected. In an application, the pixel matrix can be read out by addressing the pixels in channel A and channel B in parallel. Consequently, the signal values of signal A1 and signal B1, of signal A2 and signal B2; . . . ; of signal An and signal Bn are always at the output of the pixel matrix at the same time.

A comparator stage is preferably provided, which is designed to compare the signal values that are present in parallel at the outputs of the pixel matrix. In doing so, the digitized output value of the comparator is preferably compared with a default value in at least one of the logics A or B. If the two signal values show a big difference and the comparator reference value for the difference is thus exceeded, for example, the logic preferably generates a fail signal and the read-out process of the pixels of the 3D TOF sensor is aborted.

An analog-to-digital converter (ADC) is preferably provided that is assigned to channel A or channel B and designed to digitize the analog signal values A and B in the respective channel and transmit them to the logic of channel A or the logic of channel B. The digitized channel values can then be compared. The channel data are preferably exchanged crosswise for this purpose. If the calculated difference value exceeds the reference value, the logic preferably generates a fail signal and the read-out process is aborted.

The 3D-TOF sensor is preferably designed to perform an additional special signal processing step in such a way that the functionality of the photo receivers is checked by comparing the signal values A and the signal values B in the additional special signal processing step. When the transmitters (of at least one transmitter group) start, the pixels A and the pixels B are simultaneously activated or, more precisely, the storage capacities of the respective pixels are activated. For the two-phase mode, the activation period corresponds to twice the length of the light pulse duration, and in the four-phase mode it corresponds exactly to the length of the light pulse duration. As a result of this signal step, at the output of the pixel matrix with optically binned pixels, the same signal values are expected at the output of the two channels A and B. Identical signal values (the comparator threshold is not reached) are an indication of the functionality of the pixels.

The 3D-TOF sensor is preferably designed to perform a further special signal processing step in which the functionality of the transmitter groups is checked. When the transmitters (only one group of transmitters) are started, either pixels A or pixels B are activated or, more specifically, the corresponding storage capacities of the respective pixels are activated. The activation period is performed with twice the activation period as compared to the image cycle. For the two-phase mode, the duration of the activation period corresponds to twice the light pulse duration, and in the four-phase mode it corresponds exactly to the light pulse duration. As a result of this additional signal step, at the output of the pixel matrix with optically binned pixels, different signal values are expected at the output of the two channels A and B.

The difference in the signal values at the output of the analog pixel matrix is an indication that the respective transmitter group has sent a light pulse and is functional.

Once verification has been provided for one transmitter group, the same procedure can be used for the other transmitter group. Alternating the transmitter groups between two image cycles is a preferred method.

The 3D TOF sensor is preferably designed in such a way that the start of an image cycle occurs with the test of the first transmitter group (claim 10), and that the test of the photo receivers (claim 9) then takes place, followed by the actual image process. When the picture cycle is completed, the next picture cycle starts with the next (i. e. at least the second) transmitter group. This change of transmitter groups can be continued as needed.

According to one embodiment variant, the 3D TOF sensor can be designed to save the signal step of testing the first transmitter group (claim 10) by the transmitter groups operating in at least two different wavelength ranges (which may overlap) and the pixel matrix being set up in such a way that pixel A and pixel B are fixed to one of the two different wavelength ranges by a corresponding optical filter, with the respective optical filter only allowing one of the two wavelength ranges to pass through. A particularly preferred solution is the use of the 850 nm wavelength for the first transmitter group and the pixels of channel A and 940 nm for the second transmitter group and the pixels of channel B. If the signal step according to claim 7 is now performed, the first and second transmitter groups are activated simultaneously in this case. The pixels of channel A receive the reflected light pulse in the first wavelength range (850 nm), and the pixels of channel B receive the reflected light pulse in the second wavelength range (940 nm). If the output of channel A and channel B then has signal values of the same size or signal values at a predetermined ratio for the respective adjacent pixels addressed, it is a confirmation that both the addressed photo receivers of the two channels and the two transmitter groups are functional.

Preferably, in this case, an additional optical binning can also be provided after the two wavelengths to improve the correspondence of the signal values of the optical filtering described above.

The 3D TOF sensor can preferably be improved by adapting the area of the photoreceptors of channel A and channel B according to the selected wavelength in such a way that the different quantum efficiency for different wavelengths is compensated, i. e. that signal values of the same size are present at the output of channels A and B with an intact 3D TOF sensor.

Each channel preferably has its own processor that is connected to the signal path of the logic of the channel. Furthermore, the processors are preferably connected to the input of the respective other channel. The calculated amplitudes and the distance values that the respective logic has determined are thus transmitted to each processor.

The logical operations of each channel logic are preferably tested in such a way that each processor calculates at least one test value (random number) completely independently of the other processor. Typically, one test value is calculated for the two-phase mode and two test values for the four-phase mode. The processor transmits each test value to the logic of the same channel. Using the transmitted test values and the test values of the other channel, the logic calculates at least one output value, preferably two. The same operations are used for calculating the output value and for calculating the amplitudes and distance values. The output values are transmitted to the processor of the respective channel. The processor in turn calculates the expected output values and checks the output values received from the logic of its channel against the output values it has calculated and issues a fail signal in the event of a deviation.

In a particularly preferred embodiment, one of the two processors is preferably a safety-related processor. A safety-related processor has at least two independent reactionless computing cores and processes two inputs on one output (1oo2—one out of two). This architecture is preferably used for dividing the image operations into a safe and a non-safe image processing process. The safe process only examines whether deviations of individual pixels from the expected standard position occur in the defined field of view of the 3D TOF sensor (deformation of the 3D point cloud). If such deviation occurs, an alarm signal is emitted.

Complex image processing takes place on the non-safe processor with the goal of identifying the actual cause of the deformation of the point cloud (e. g. recognizing the movement of a person, a hand, a head, etc.).

A second variant of the application proposes a 3D TOF sensor that is preferably characterized by the following features:

The 3D TOF sensor has an image sensor with a pixel matrix, wherein,
- the pixel matrix has at least two separate independent blocks and transmits the data in at least two separate signal paths; and/or
- the pixels of the pixel matrix of the image sensor have at least one photosensitive receiver and one storage cell for storing charge carriers; and/or
- the signal paths are at least made up of an analog-to-digital converter (ADC), a programmable logic, storage cells and a processor connected thereto; and/or
- the image sensor has at least one global shutter for all blocks that can be released by a control signal of the programmable logic and can set a minimum shutter time of less than 100 ns; and/or
- the signal paths are wired independently and reactionlessly of each other; and/or
- the signal paths are wired such that the data of the logics or the processors can be exchanged crosswise; and/or
- each block of the image sensor is assigned its own imaging optics such that the same image of the object side is mapped on the blocks. The distance between the optics is selected to be so small that the parallax error cannot be resolved; and/or
- each block is assigned at least one light source that is synchronized with the global shutter via the logic.

The image sensor is preferably characterized in that each block has a separate global shutter that can be controlled by the logic of the assigned signal paths.

The image sensor is preferably characterized in that the global shutters of the blocks only depend on a single logic signal of a single signal path and their dependency is set by adjustable delay times (register values).

Alternatively, or additionally, the image sensor is further preferably characterized in that, for each block,
- a narrow optical spectral range is assigned by an optical filter or a system of optical filters; and/or
- the system of optical filters is formed by filters directly on the image sensor and at least one further filter in the imaging system of the optics; and/or
- the optical filters on the blocks of the image sensor ensure, as edge filters, a sharp spectral separation of the blocks, while the filter in the optical imaging system is designed as a band filter and includes the spectral ranges of the blocks; and/or
- each spectral range of the blocks is assigned a light source which emits light precisely in the wavelength that corresponds to the transmission range of the optical filters of the corresponding block.

This corresponds to a method of reliably recording 2D image data with an image sensor of the aforementioned type, comprising the following method steps:

In a first processing step, the global shutter is released by a previously defined exposure time. As a result, there is a charged image in the memory of the pixels on both blocks that corresponds to the object image.

In a second processing step, the image data of the first block is transferred to the processing line of the first block (readout block 1) and the image data is transferred to the processing line of the second block (readout block 2), etc. As a result of this step, the image data is now available in digital form in the blocks.

The invention will now be explained in more detail using exemplary embodiments and referencing the figures.

BRIEF DESCRIPTION OF THE FIGURES

The figures show the following:

FIG. 8);

DETAILED DESCRIPTION OF THE FIGURES

The starting point of the invention is a general arrangement as described in EN ISO 13849 (machine safety), according to which SIL-3 (Cat. 4; PL e) can be achieved by designing the system with at least two signal paths so that the integrity can be achieved by a cross comparison of the two parallel signal paths; see FIG. 3.

Figure 3:
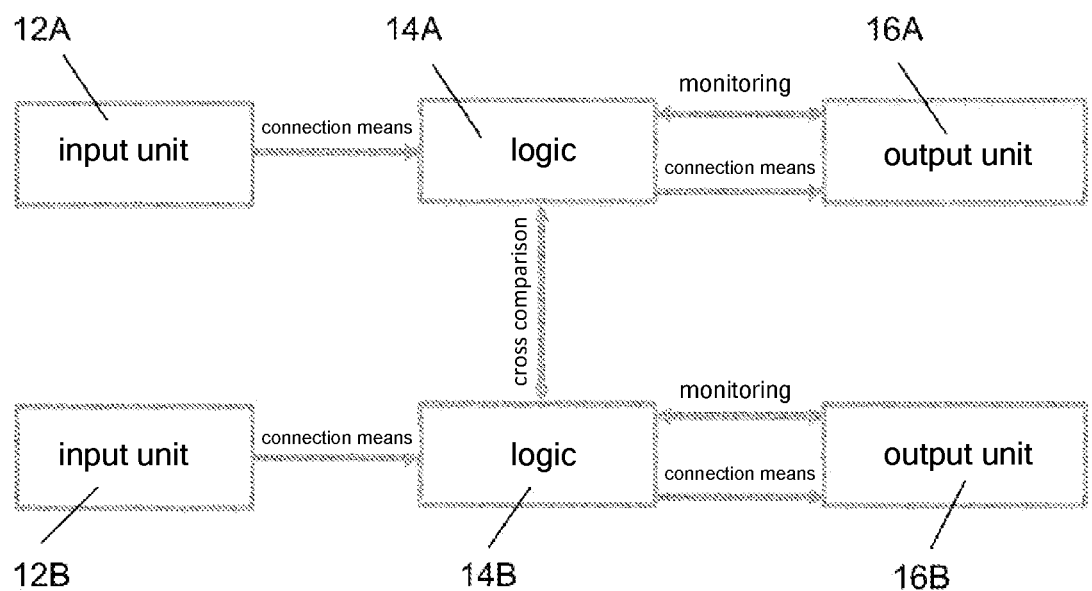
FIG. 3: illustrates the basic structure of a TOF sensor according to the application with two parallel paths and a cross comparison of these.
Figure 4:
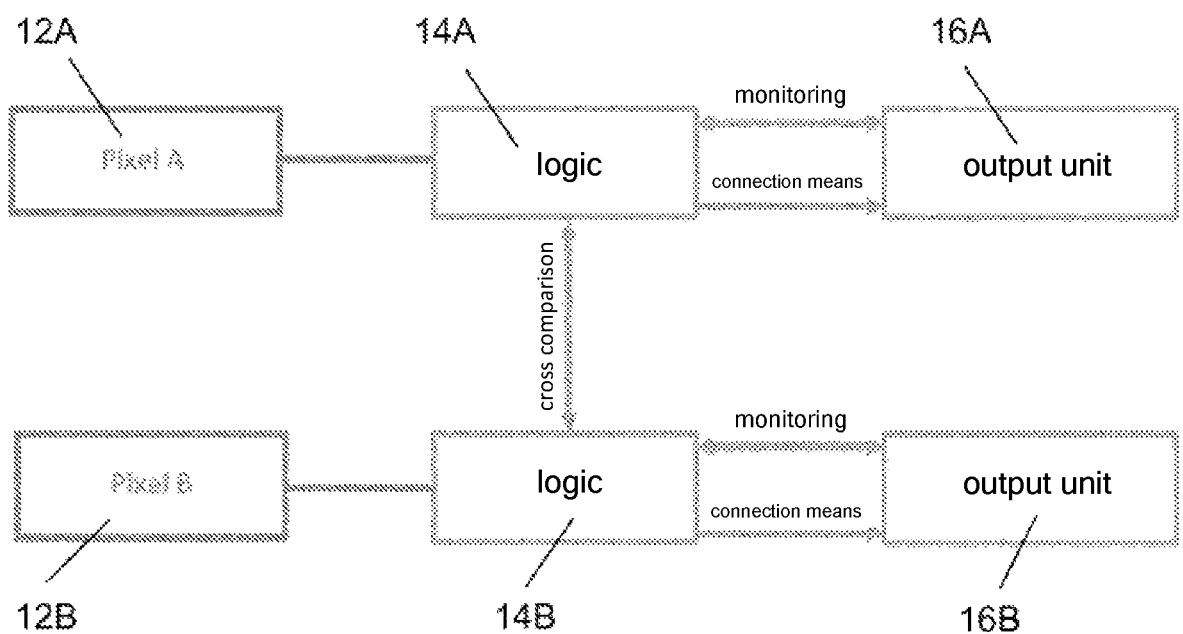
FIG. 4: illustrates how the basic structure shown in FIG. 3 can be implemented on the pixel level of a 3D TOF sensor.

According to the basic structure of a 3D TOF sensor 10 shown in FIG. 3, it has two input units 12A and 12B, which can be created by pixels; cf. FIG. 4. The output signals generated by the input units, for example the output signals of the pixels, are respectively transmitted to a logic 14A and 14B that evaluate the output signals of the input unit 12A and 12B. The logics 14A and 14B are interconnected for cross-comparison purposes. In the context of the cross comparison, it is in particular tested whether the logics 14A and 14B each deliver the same output signal. If the result of the cross comparison is positive, the signals received by the input units 12A and 12B and processed by the logics 14A and 14B are output to a respective output unit 16A and 16B.

The 3D TOF sensor as per FIGS. 3 and 4 thus has two parallel signal paths, one of which is created by the input unit 12A, the processing logic 14A and the output unit 16A, and the second signal path is created by the input unit 12B, the processing logic 14B and the output unit 16B. The first signal path thus creates a channel A, and the second signal path creates a channel B. The proposal now is to apply this parallel system to a 3D TOF sensor.

In the following, the terms "signal path" and "channel" are therefore used synonymously.

First Variant

In the context of the first variant, the principle with at least two pixels (pixels A and B) described above is applied in such a way that continuous parallel processing with comparison of the signal paths A and B is achieved. Comparison of the signals is performed at different levels of the signal processing; see FIG. 4.

All pixels A and B are arranged as a matrix in respectively the same rows, columns, or as a chessboard.

Figure 5:
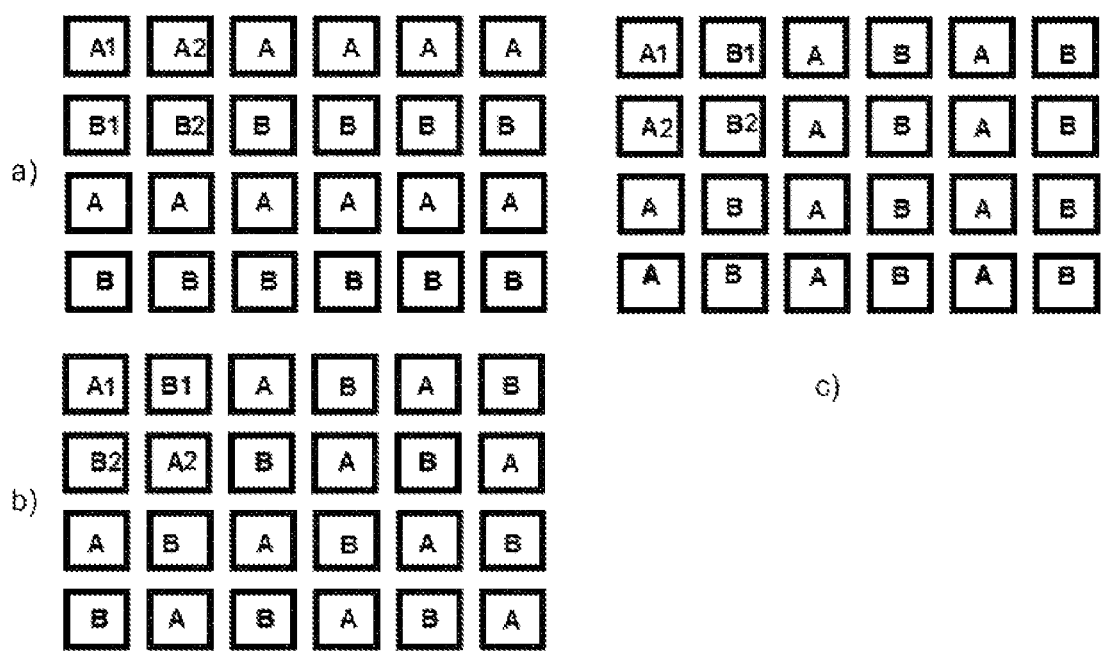
FIGS. 5a-5c: illustrate different variants of how the pixels of a pixel matrix can be divided into two channels (channel A and channel B)

The signal paths are strictly separated according to channel A and channel B. This applies to both the analog and the digital signal path, regardless of whether the receiver matrix integrated in silicon is exclusively analog, or analog and digital; see FIG. 5.

There are thus both implementation options, namely integration of only the analog circuit parts in silicon and use of an external logic on an FPGA, or full integration of all components in silicon or another semiconductor material.

Optical Binning/Testing of the Receiver Function

The combination of several pixels on the circuit level is a known technical fact. This procedure is used to:
- decrease the resolution,
- increase the image speed, or
- improve sensitivity and reduce noise.

Optical binning is introduced as a new feature to ensure that pixels A and B receive identical optical power (image).

Optical binning can be achieved by placing a homogenizing diffuser over pixel A and pixel B. This arrangement can be accomplished in such a way that only the optically sensitive surfaces (photo receivers) involved in pixel A and B are optically connected. However, it is also possible to place the diffuser over the entire pixel geometry. Another variant results from the use of micro-optics as they are already frequently used to increase the fill factor in CMOS image sensors. The micro-optics are then placed over the diffuser.

In a further embodiment variant of the first variant, the diffuser and micro-optics can also be implemented in one element on a micro-optical basis.

Figure 6:
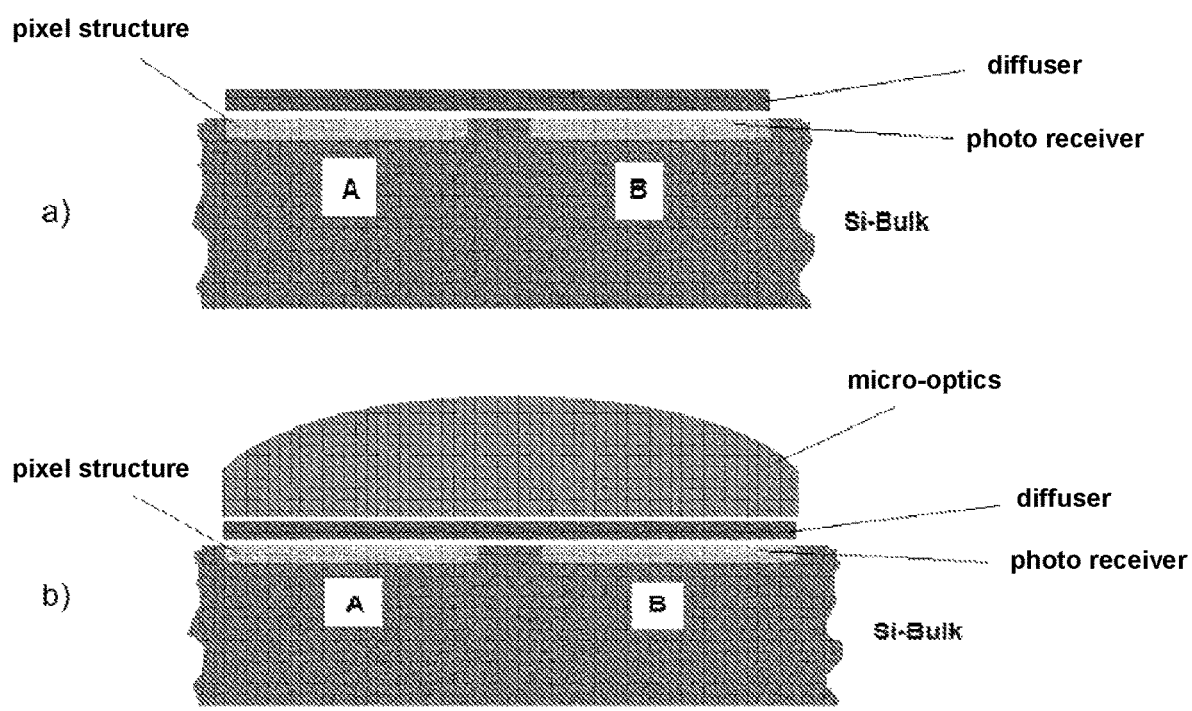
FIGS. 6a, 6b: illustrate in a sectional view how optical binning can be implemented.
Figure 7:
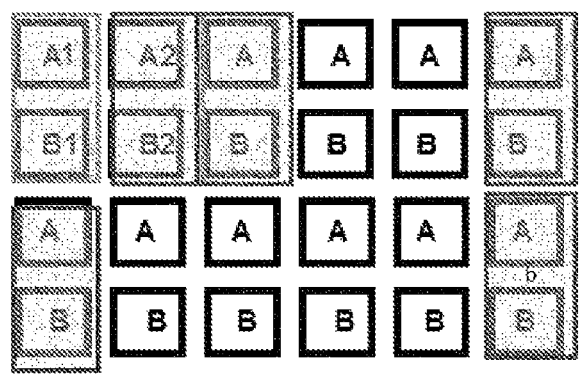
FIG. 7: uses the example of the pixel matrix from FIG. 5a to illustrate how the pixels of channels A and B to be evaluated in pairs can be optically connected in parallel by way of optical binning.

Based on the matrix arrangement of pixels A and B, A1 and B1, A2 and B2 . . . An and Bn are optically connected to each other, provided the analog signal path of A1 and B1 or A2 and B2, An and Bn are designed to be identical in length to maintain the same signal propagation times. This requirement also applies to the digital triggering signals of the switching transistors of the respective optically binned pixels; see FIG. 6 and FIG. 7.

The functionality of the parallelized photo receivers is tested with an additional signal step. The object of this signal step is to test whether channels A and B deliver an identical signal value. These signal values must be well above the noise level (zero signal).

This is achieved by simultaneously scanning the reflected light pulse. For the two-phase mode, the scan time corresponds to twice the length (see FIG. 8) of the light pulse duration, and in the four-phase mode it corresponds exactly to the length of the light pulse duration. The cycle of sending and scanning the reflected light pulse should preferably be repeated several times in this case as well, until a sufficient charge quantity has accumulated in the memories of both pixel A and pixel B.

Figure 9:
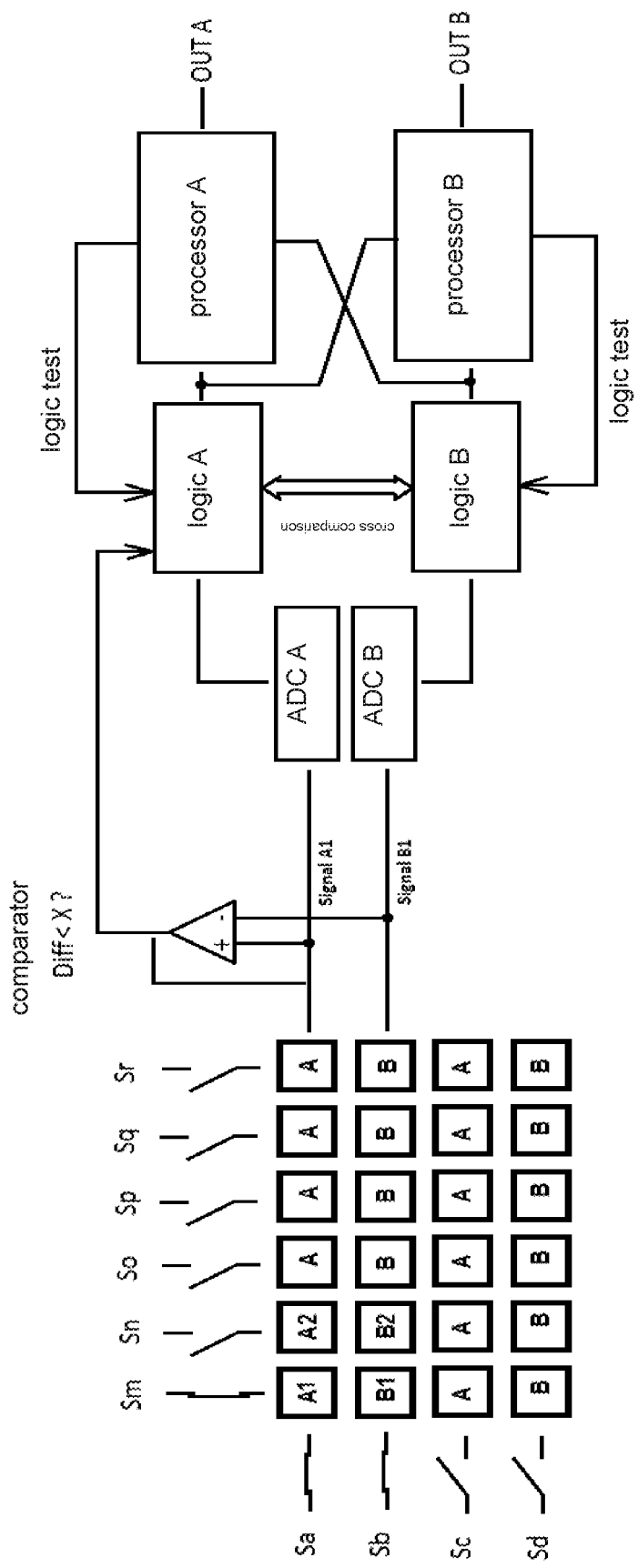
FIG. 9: shows a circuit diagram for scanning a pixel matrix according to the FIGS. 6 and 7 based on the principle depicted in FIG. 8.

The circuit diagram is outlined in FIG. 9. The memories of the optically binned pixels (A1 and B2) are selected simultaneously after completion of the integration phase and applied to the output of the analog matrix. The charge quantities of pixels A1 and B1 are compared in the analog signal path for the first time (e. g. by using a comparator) to check whether the differential voltage between A and B is below a previously defined threshold value. Depending on the number of memories in the pixel (two-phase or four-phase), this cycle can be performed once or twice per pixel. It is also possible to implement a circuitry parallelization of the memories a and b.

The signal values are then digitized in an analog-to-digital converter (ADC A and ADC B; see FIG. 9) and compared a second time. The operations can be performed both by the downstream logic and/or by the processor A or B downstream from the respective logic A or B. The logic A and the logic B differ from the processor A and the processor B in their form of implementation. The logics are circuits that implement the logical operations on the circuit level and can, for example, exist in the form of an FPGA (Field Programmable Gate Array). The mode of operation of the processors, on the other hand, is determined by sequence programming (e. g. in the form of firmware). The processors can be digital signal processors (DSP), for example.

If the defined differential value is exceeded in the analog or digital range, a fail signal is generated in the logic block and the image recording is stopped. This fail signal is transmitted directly to the processor interfaces (output) via the signal path.

The processor output in connection with a safe control can then lead a machine to a safe stop, see FIG. 9.

Duplicated Implementation of the Light Sources/Testing of the Functionality of the Transmitters Just like the signal path is duplicated, the lighting of a 3D TOF sensor with optically binned pixels is also duplicated. At least two transmitter groups are used alternately; see FIG. 10.

Figure 10:
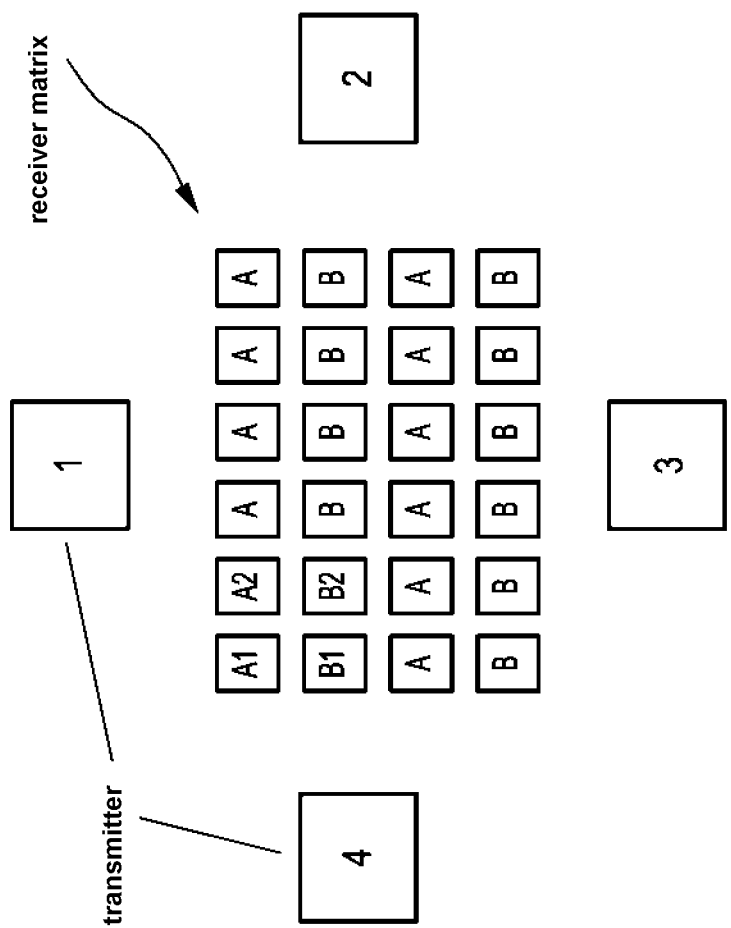
FIG. 10: shows that the light for emitting the light pulses is also duplicated and can have two transmitter groups with two transmitters each to be used alternately.

A transmitter group consists of at least one transmitter. FIG. 10 shows the duplicated implementation of the transmitter group, in each case represented by two transmitters. The transmitters 1 and 3 as well as 2 and 4 are operated in parallel and alternately. LEDs or laser diodes can be used as transmitters (e. g. VCSEL); see FIG. 10.

Extended Cycle for Testing the Transmitter Function

The optical binning and additional signal step can be used to test whether the photo receiver and the signal processing pipeline are delivering the same signal values. The parity of the signal values can be determined by way of a difference value, which should be below a threshold value to be specified.

In this step, no determination can be made about the functionality of the transmitters. Another additional processing step can provide information about this.

Figure 8:
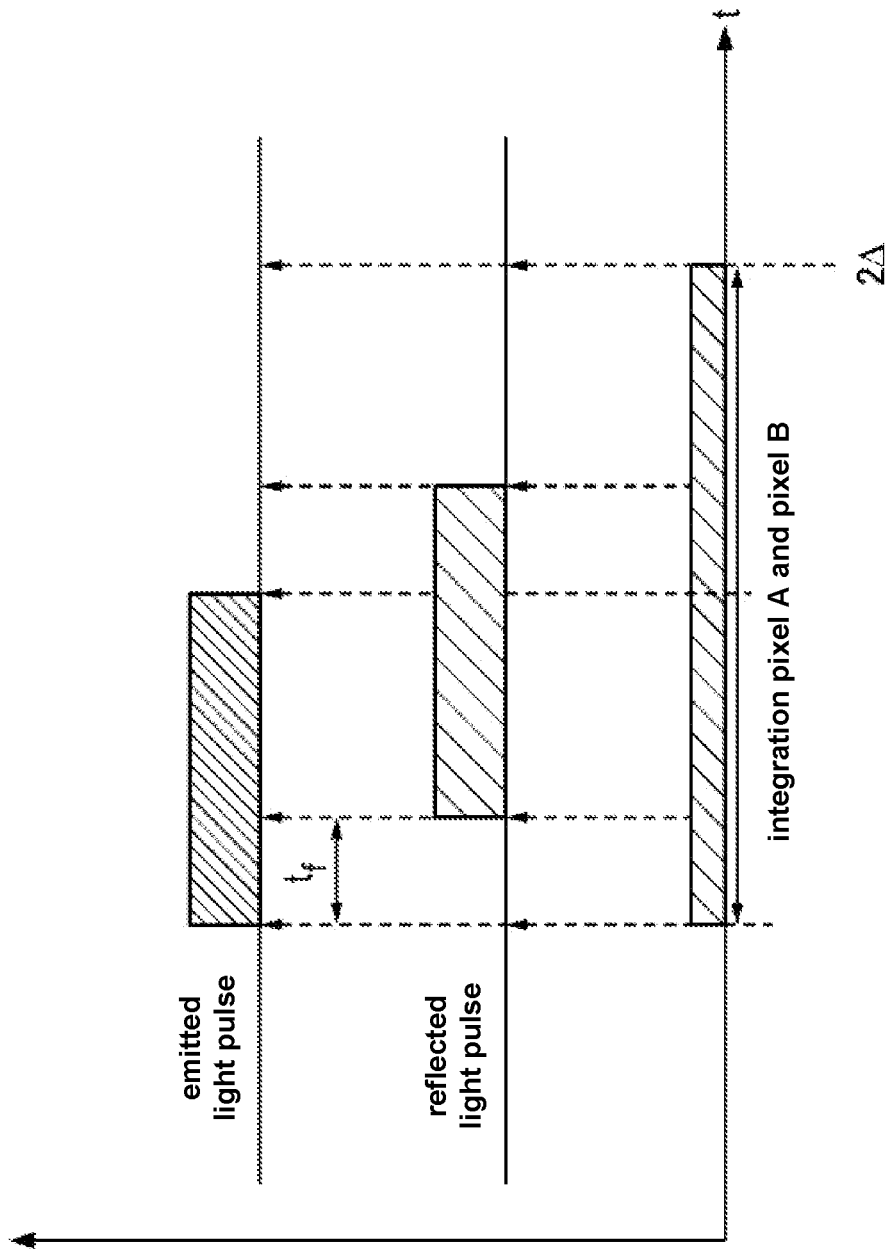
FIG. 8: illustrates the simultaneous scanning of the reflected light pulse.
Figure 11:
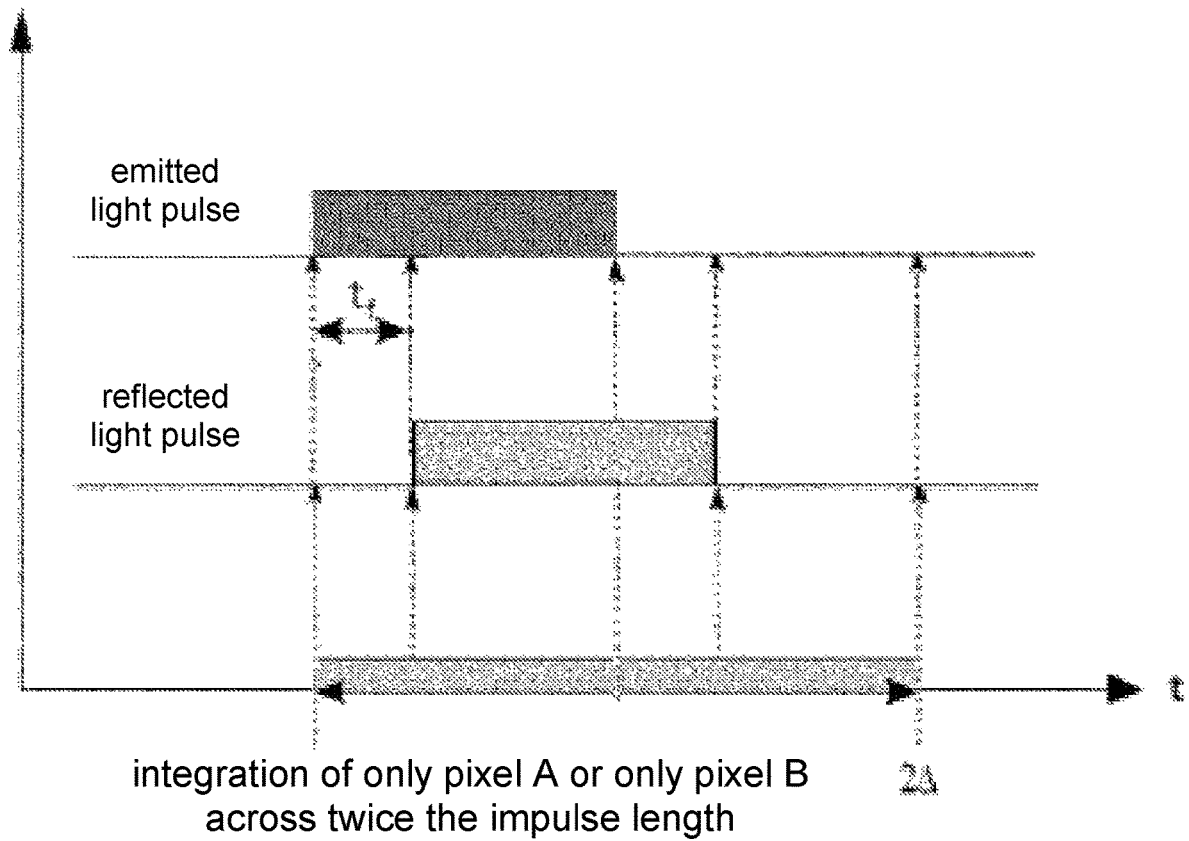
FIG. 11: illustrates the scanning of only one of the pixels, i. e. pixel A or pixel B, instead of the simultaneous scanning of pixels A and B shown in FIG. 8 so as to obtain a measure for the amount of light of the activated transmitter group.

If, instead of the simultaneous scanning of the reflected light pulse from pixel A and pixel B described in FIG. 8, only one pixel, i. e. either A or B, is scanned, a signal above a threshold value is generated when the difference value is determined in the comparator stage (analog) or in the digital logic part; this signal provides a measure of the amount of light from the activated transmitter group; see FIG. 11.

In the running image cycle, the signal steps according to FIG. 8 and FIG. 11 are put before the actual image generation so as to monitor the signal paths.

| Testing transmitter group 1 | Testing receiver | Image process | Testing transmitter group 2 |
|---|---|---|---|

The transmitter group 1 and the transmitter group 2 are activated alternately during the cycle.

Alternative Test Mechanism of the Transmitter Function by Splitting the Transmitter Wavelengths A particularly advantageous embodiment of the continuous parallelism of the signal routing can be achieved by the transmitter groups transmitting in different wavelengths, while the pixels A and B can react selectively to the respectively different wavelengths; see FIGS. 12a and 12b.

The advantage of this method is that the signal step described with reference to FIG. 11 does not have to take place iteratively once for the first and for the second transmitter group, but that this step can take place simultaneously since both transmitter groups can be activated at the same time and recognized selectively because of the wave selectivity of the receivers.

The optical binning then occurs in a wavelength-selective manner. This means that a typical implementation could use a narrow band filter and homogenization function with a central wavelength of 850 nm, and for the second receiver group with a central wavelength of 940 nm.

Figure 13:
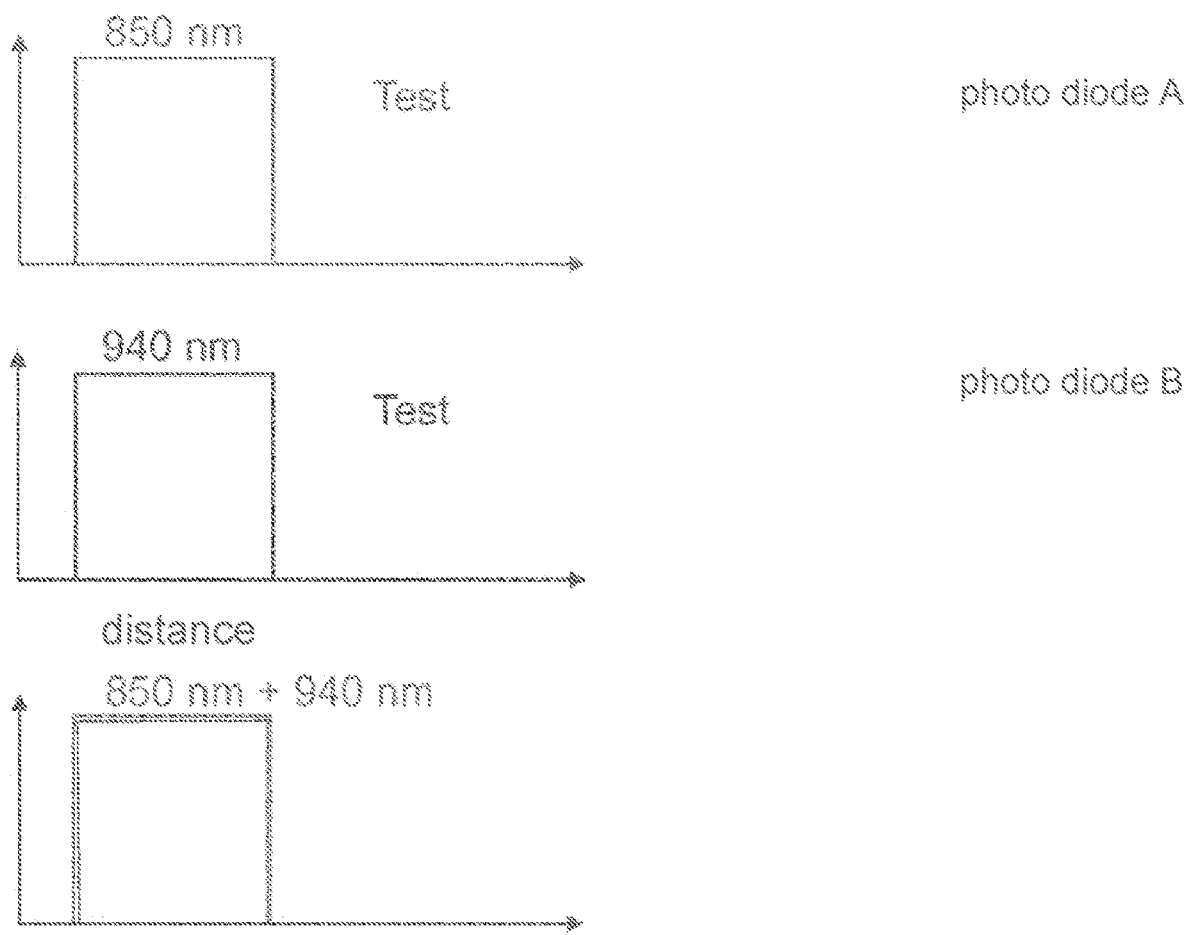
FIG. 13: shows that the surface area of the pixels in a pixel matrix according to FIG. 12a or 12b can have a different size, if the quantum efficiency of the pixels is different for the respective wavelength, in order to obtain the depicted output signals with comparable levels by compensating a lower quantum efficiency with a larger pixel area.

In a special embodiment, the optically sensitive surfaces of the photo receivers could be designed in such a way that the different quantum efficiencies of the different wavelengths are balanced (in silicon, the quantum efficiency for 940 nm drops by about 30% compared to 850 nm). A larger sensitive area of the receiver with low quantum sensitivity could offset the disadvantage; see FIG. 13.

Figure 12:
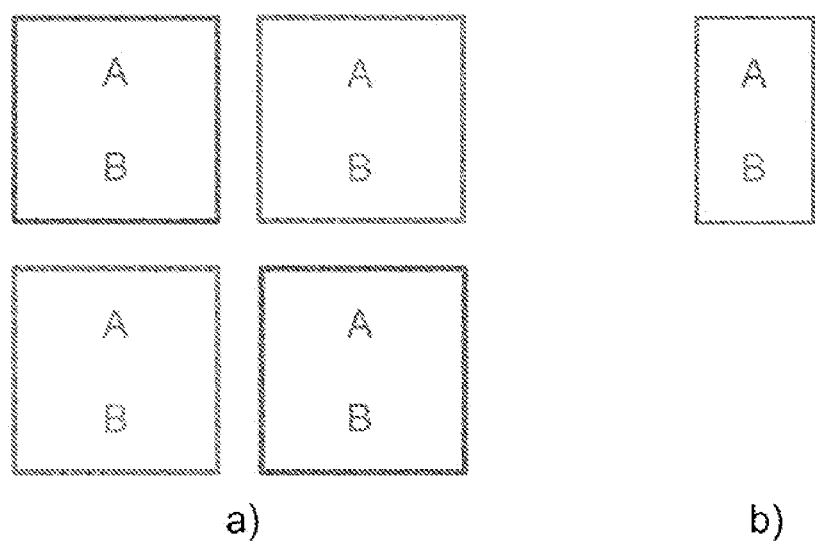
FIGS. 12a, 12b: illustrate that the respective pixels A and B of the pixel matrix can be sensitive to different wavelengths or different wavelength ranges.
Figure 14:
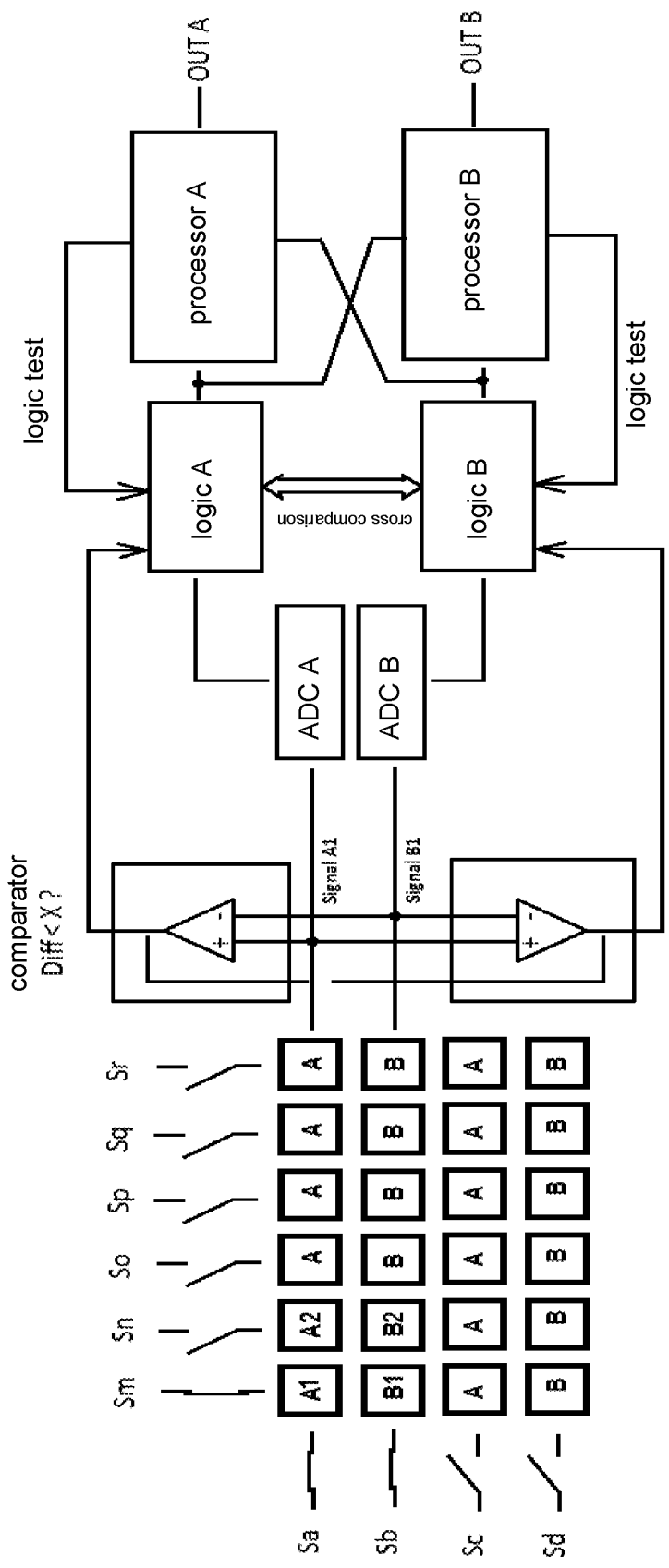
FIG. 14: shows a logic circuit with a further comparator for testing channels A and B, which respectively operate in two wavelength ranges.

FIG. 12 shows different arrangements of the wave-selective solution. In FIG. 12*a*, A and B operate in both wavelengths. The functionality of A and B is checked for each wavelength. As a consequence, another comparator can be used. Depending on which wavelength is used, either logic A or logic B processes the comparator signal (FIG. 14).

If the filter arrangement according to FIG. 12*b* is used and the transmitter groups with the two different wavelengths are activated simultaneously in the test step, the transmitter test and the receiver test can be performed at the same time. Since the difference signal at the comparator output between channels A and B is smaller than a defined threshold value, it can be concluded that both transmitter groups and the photo receivers of both channels are functional.

Function of the Logics A and B

Figure 18:
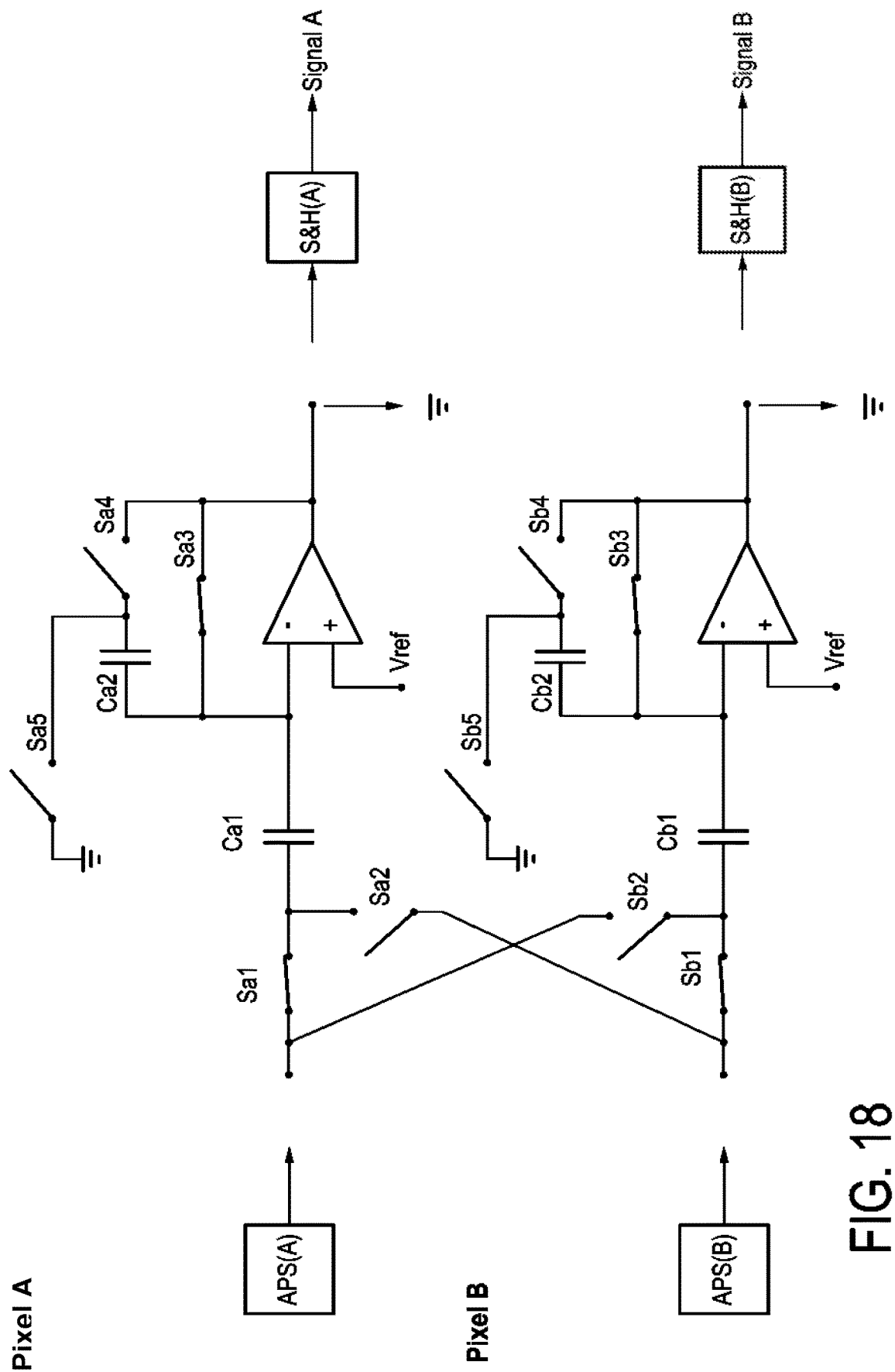
FIG. 18: shows the CDS step of the image sensor from FIG. 16 in a first switching status.
Figure 19:
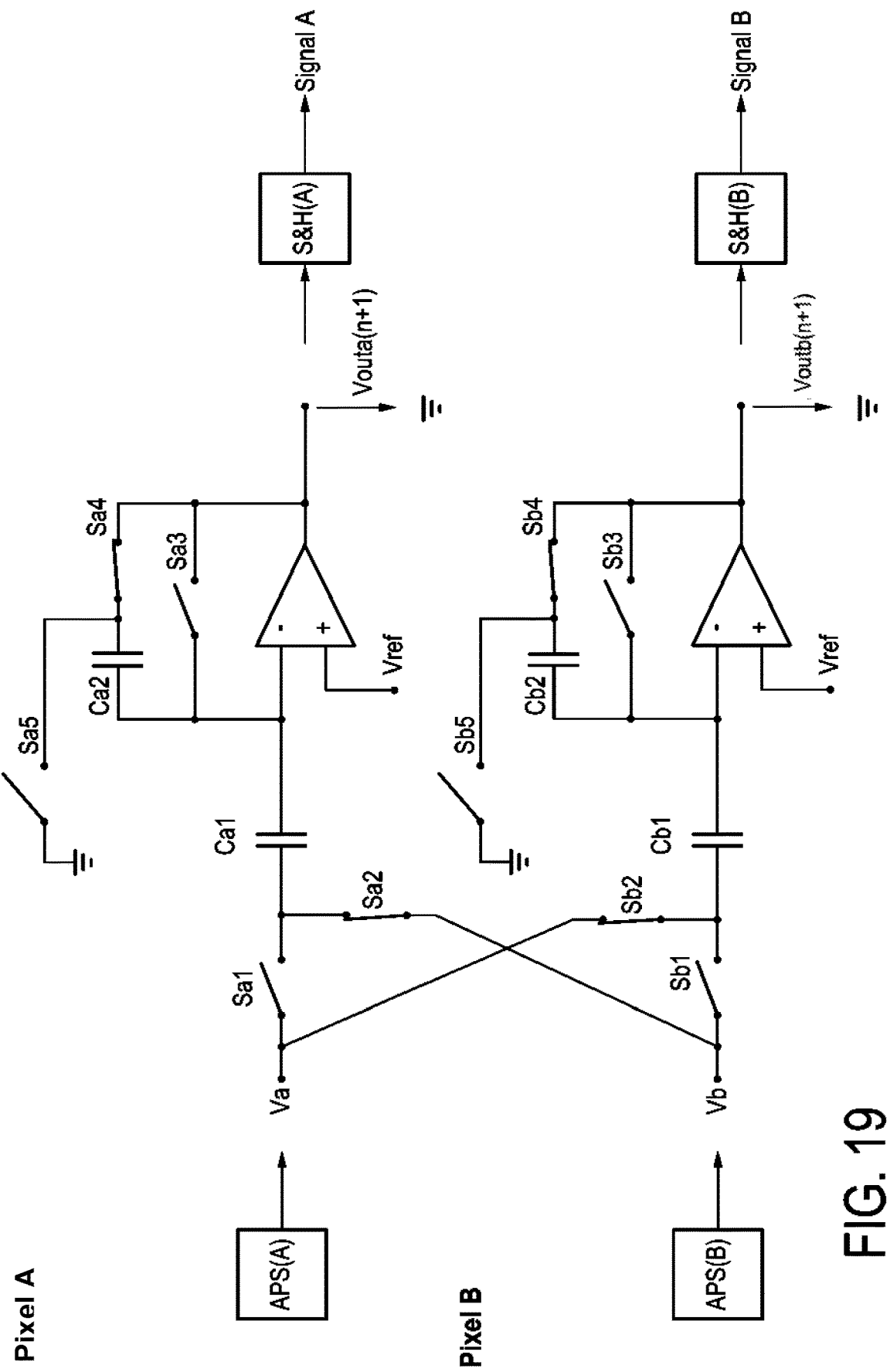
FIG. 19: shows the CDS step of the image sensor from FIG. 16 in a second switching status.
Figure 20:
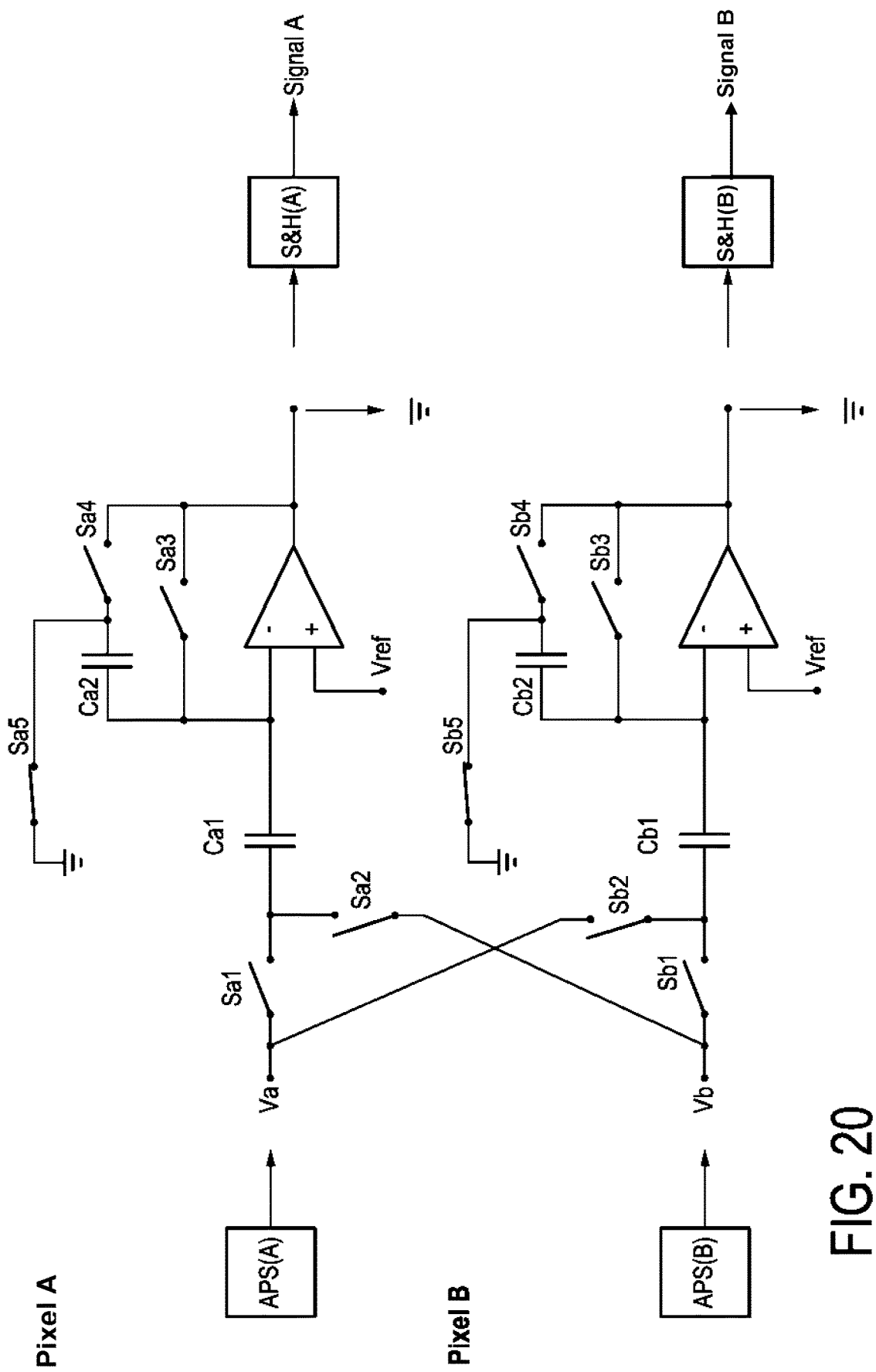
FIG. 20: shows the CDS step of the image sensor from FIG. 16 in a third switching status.

Logic A supplies the control signals for the photo receivers of channel A, for example to control the switches of the CDS step for signal path A shown in FIGS. 18 to 20. Logic B supplies the control signals for the photo receivers of channel B, for example to control the switches of the CDS step for the signal path B shown in FIGS. 18 to 20. A synchronization of the logics ensures that the correct pixels pairs are addressed in the read-out process. The validity of the signal values is determined by means of the comparator signal.

In a further processing step, the digital difference signal of the channels is calculated separately in each logic. To this end, the logics exchange the digitized channel data, provided they are considered to be valid. If the digitized difference signal of pixels A and B exceeds the threshold value, a fail signal is transmitted to the corresponding processor.

Both logics calculate the signal amplitude values and the distance values independently. The calculated values of logic A are transmitted to processor A, and the values of logic B to processor B. In addition, the calculated values are delivered crosswise. Each processor then compares the amplitude and distance values. If the comparison results in a deviation, the respective processor sends a fail signal.

Function Test of the Logics

Between the image cycles, the processors send a digital input value (random number) to the upstream logics. The logics introduce this random number into their processing pipeline and use it to calculate an output value that is checked for correctness by a processor routine for each processor. Processing includes the exchange of input values between the logics. The test process for each logic thus uses the input values of channel A and channel B for the calculation.

The calculating functions correspond to the operations for determining the distance and amplitude values. A fail signal is output via the respective processor if the comparison in a processor results in an error.

Function of the Processors A and B

In a first embodiment, both processors perform identical operations. Each processor has its own memory and own interfaces.

The outputs OUT A and OUT B are processed on a downstream level (e. g. safety-related control).

In a second embodiment, which is particularly advantageous for complex image processing operations,
 e. g. motion analyses of people, a safety-related processor is used for one of the processors (e. g. channel A).

A safety-related processor has itself an internal parallelized reactionless architecture. These types of processors are known (e. g. HICore 1—https://www.hima.com/en/products-services/hicore-1/); they have a so-called 1oo2 architecture (one out of two), for example. In this case, the processing is divided into a safe process and a non-safe process.

The division will be explained using the following example.

When monitoring a work area, it is important to prevent a hand from entering a safety zone or to stop a machine if a hand enters the zone.

Since recognizing a hand requires certain complex image processing operations (computing time), the process is divided in such a way that a certain area is defined as a three-dimensional safety zone. The safety-related processor consequently only monitors the position of the point cloud in the safety zone defined in the FOV (field of view). A deviation (deformation) of the point cloud would result in a fail signal. Monitoring the position of the point cloud is a relatively simple operation.

Figure 15:
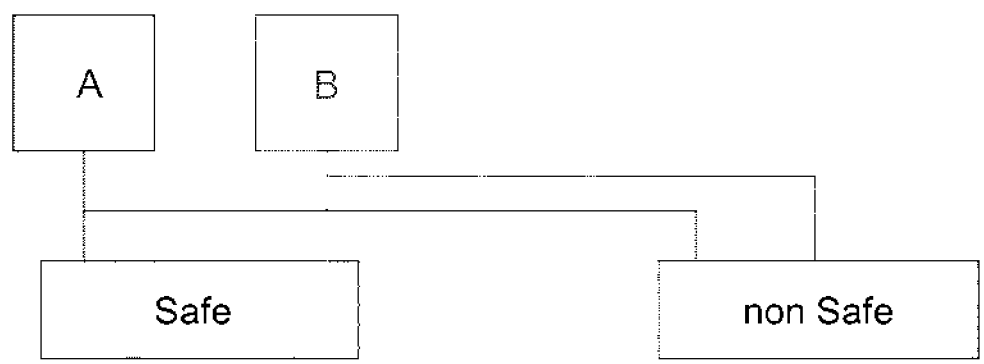
FIG. 15: shows that, instead of two identical processors A and B for evaluating the signals of channels A and B, two different processors can be used, one of which is a safety-related processor.

The other processor examines which object has entered the safety zone. The corresponding operations are complex and are implemented using modern high-level languages. In the case of a hand, for example, it results in an instruction to the operator; see FIG. 15.

There is also the option, by expanding the circuit, to implement the operational amplifier of the CDS step also as a comparator for comparing the signal values of pixels A and B on the analog pixel level.

Figure 16:
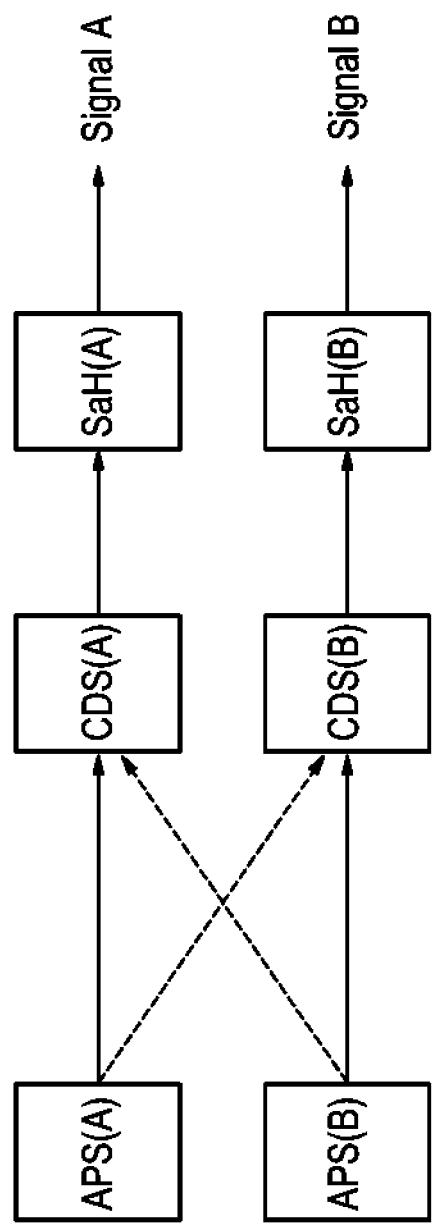
FIG. 16: shows the basic structure of an image sensor in which the operational amplifier of the CDS step, by expanding the circuit, also acts as a comparator for comparing the signal values of pixels A and B on the analog pixel level.

FIG. 16 shows the basic configuration of a corresponding image sensor. In the following FIGS. 18 to 20, the CDS steps in various switching states are shown in more detail.

As an example, a pixel is made up of an APS cell, a CDS and a sample and hold step here (marked with S&H in the figures).

On the one hand, the CDS step serves as an accumulator for the necessary multiple exposures, and at the same time as a step for suppressing the noise components from the reset of the photodiode of the APS cell as well as for blocking background light.

The cross comparison with the adjacent pixel according to the sequence already explained is now introduced into the CDS step.

Figure 17:
FIG. 17: illustrates the read-out cycle.

FIG. 17 illustrates the read-out cycle.

The mode of operation can easily be explained using the function of the CDS step.

Phase 1:

In pixel A—the switches S1*a*, S3*a* are closed; the switches S2*a*, S4*a* and S5*a* are open.

In pixel B—the switches S1*b*, S3*b* are closed; the switches S2*b*, S4*b* and S5*b* are open.

We get the following ratios:

In Pixel A:

$Q'1a=C1a(Va-Vref); Q'2a=C2a(Vref-Vouta(ns))$

In Pixel B:

$Q'1b=C1b(Vb-Vref); Q'2b=C2b(Vref-Voutb(n))$

FIG. 18 shows pixels A and B in a first switching state of the CDS steps, which they assume in phase 1.

Phase 2:

In pixel A—the switches S2a, S4a are closed; the switches S1a, S3a and S5a are open.

In pixel B—the switches S2b, S4b are closed; the switches S1b, S3b and S5b are open.

In pixel A:

$Q''1a = C1a(Vb - Vref); Q''2a = C2a(Vref - Vouta(n+1))$

In pixel B:

$Q''1b = C1b(Va - Vref); Q''2b = C2b(Vref - Voutb(n+1))$

Using Kirchhoff's nodal rule, it can be written as follows:
In pixel A:

$Q'1a + Q'2a = Q''1a + Q''2a$

If the relationships for the charges are inserted into this equation, the following result is obtained after a corresponding rearrangement:

$Vouta(n+1) = C1a(Vb - Va) + C2a Vout(n)$

Equivalently, the ratio at the output of pixel B is obtained:

$Voutb(n+1) = C1b(Va - Vb) + C2b Vout(n)$

Phase 1 and phase two are repeated several times (n times) in order to achieve a sufficient output voltage on the capacitor C2a or C2b.

FIG. 19 shows pixel A and pixel B in a second switching state of the CDS steps, which they assume in phase 2.

Phase 3—Test Phase

All switches are open, only switches Sa5 and Sb5 are closed. In this phase, the operational amplifier acts as a comparator in both pixels.

The resulting voltage on the capacitors Ca2 and Cb2 is compared with the respective reference voltage.

FIG. 20 shows pixel A and pixel B in a third switching state of the CDS steps, which they assume in phase 3.

The differential voltage Vb-Va accumulated multiple times is present across the capacitance Ca2.

The differential voltage Va-Vb accumulated multiple times is present across the capacitance Cb2.

We then compare 3 cases.
1. N×Vouta(n+1)=N×Voutb(n+1)—That would be the ideal case if pixel A and pixel B delivered the same value. This ideal case is only theoretical in nature due to the physical properties of real components.
2. N×Vouta(n+1)≈N×Voutb(n+1)—The values at the output of pixel A and pixel B are approximately the same. One of the values is a little higher or a little lower than the other. In this case, both pixels can be considered to be functional.

A logical 0 appears on both output lines of the comparator.
3. N×Vouta(n+1)≠N×Voutb(n+1)—The output value of pixel A is either much greater or much smaller than the output value of pixel B. A pixel is to be considered defective.

In this case, a logical 1 would be present at the pixel output A if Vb>>Va.

In the case of Vb<<Va, a logical 1 would be present at the output of pixel B.

The CDS step is reset after the comparison, and a new cycle can start.

The switches of the respective CDS step are controlled by logic A or logic B assigned to the corresponding signal path.

Additional Mode of Operation

The introduced subtraction Vb-Va and Va-Vb can also be used very advantageously in a 4-phase operation. In this case, the subtraction can be used to calculate the phase angle without reading out the individual values, as described above, by calculating the phase shift q as follows:

$$\varphi = \tan^{-1} \frac{Aa - Ab}{Ba - Bb}$$

The prerequisite is the use of two additional pixels so that a group of four pixels or a group of two pixels, but with a total of four memory cells, results in a complete 4-phase architecture.

Second Variant

Figure 21:
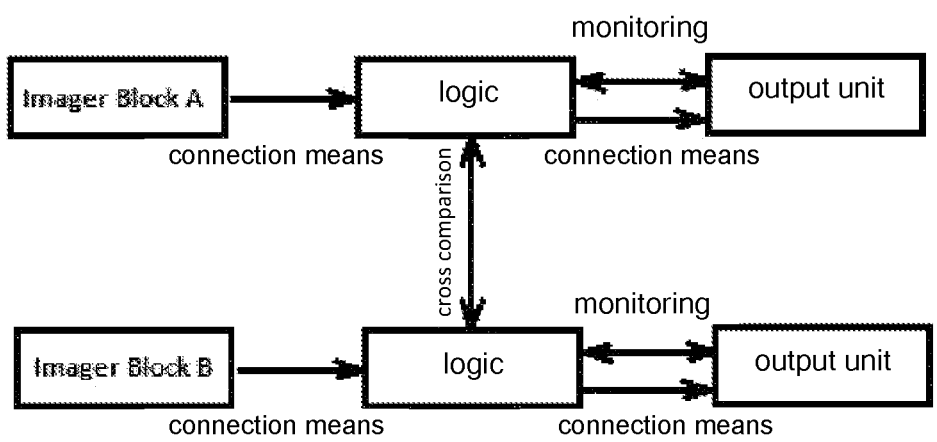
FIG. 21: shows a high-resolution image sensor, which has several parallel read-out channels that are used for reading out the pixels block by block.

According to a second variant, image recorders (imagers) are set up e. g. in CMOS technology with high resolution, preferably with several parallel read-out channels; see FIG. 21. The object of this architecture is to achieve a high frame rate in spite of the high resolution. The read-out channels usually combine either several rows or several columns of an image sensor matrix. This type of combination will be referred to as a block or an imager block in the following; see FIG. 22.

Figure 22:
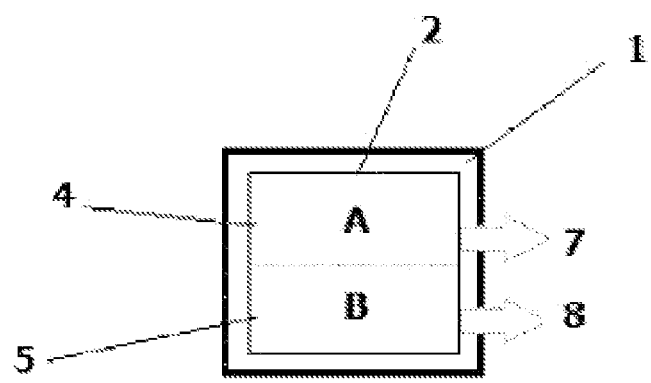
FIG. 22: shows an image sensor with two pixel blocks A and B, with each one being sensitive to different wavelength ranges.

FIG. 22 shows the following individual components:
1—imager
2—optically sensitive surface
4—imager block A with spectral filter A
5—imager block A with spectral filter B
7—read-out channel for imager block A
8—read-out channel for imager block B.

The second variant takes advantage of this division of the image field into read-out blocks.

An additional variant will be explained in more detail below using a first. exemplary embodiment.

The image field, which preferably has a very high resolution, e. g. 1280×1024 pixels, is divided into blocks according to the read-out channels created. Each read-out block operates with a global shutter that can be released separately.

Each block is still assigned its own imaging optics. The distance between the optics is very small so that parallax is no longer resolved even at a small object distance on the image side. This means that the same image of the object side is generated on each block.

This arrangement of optics and image recorder is used in a parallelized read-out and image processing circuit according to FIG. 4.

Calculation of a Depth Image:

The exemplary embodiment is based on a two-channel set-up. The image recorder (imager) is divided into block A and block B. In the present exemplary embodiment, each block has 640×1024 pixels. The digital read-out channels for block A and block B are routed to the corresponding logics A and B. It is irrelevant whether these logic blocks are already part of an integrated circuit or comprise an external logic circuit, e. g. an FPGA.

The logics A and B control the respective global shutter signals and accordingly also the lights LA and LB. The light sources are operated synchronously. Both sources are activated simultaneously with the global shutter signal from block A at time t0 for the duration ti=tA. The light pulse is reflected on a target and registered by all receivers A of block A offset by the time of flight tof. The charge quantity (photoelectrons) resulting from the registration of the light pulse is stored in the storage capacity (A1) belonging to each receiver. The receivers of block A can only pick up part of the reflected light pulse that corresponds proportionally to the time difference tA-tof.

The global shutter of the receivers of block B is activated with a time delay t0+tA. Receiver B is active for time tB (in the example tA=tB). The receiver also registers only part of the reflected light pulse that corresponds proportionally to the time difference tof+ti−tA (if ti=tA, this is tof). The corresponding charge quantities are stored in the storage capacity B1 belonging to each receiver in block B.

Since the reflected signals can be very weak depending on the reflectance of the target and the distance, it is necessary to provide an amplification mechanism. This is achieved by repeating the measurement described above many times and accumulating the respectively registered charge quantity in the associated storage capacities until a sufficient signal level is reached. This process can be repeated 100 times, for example.

As a result, there is an image in the storage capacities A1 of block A for the time period t0 to tA, and there is an image in the storage capacities B1 for the time period tA to tB.

These two images are transmitted to the respective logic via the respective read-out channel. The logics subsequently exchange the image information crosswise and calculate the respective depth image separately, pixel by pixel, according to the above rules:

$Q1=A/(A+B)$ (elimination of the dependence on reflectance through formation of quotients)

$Q2=B/(A+B)$ $tof1=(1-Q1)*T$ $tof2=Q2*T$ $tof=\frac{1}{2}(tof1+tof2)$ (average)

$S=\frac{1}{2}(c*tof)$

The calculation rule is applied in such a way that pixels are always calculated according to their position in the receiver matrix, i. e. A0,0 with B0,0; A0,1 with B0,1; . . . . Am,n with Bm,n according to the chosen arrangement:
A0,0 . . . A0,n $A0, 0 \ldots A0, n$ $\cdot \ldots \cdot$ $Am, 0 \ldots Am, n$ $B0, 0 \ldots B0, n$ $\cdot \ldots \cdot$ $Bm, 0 \ldots Bm, n$ At the end of the calculation, both logics each contain a distance image. Both distance images should be identical except for a temperature-dependent calibration factor that can be determined once.

Testing the Function by Comparing the Depth Image:

The identity of the two depth images A and B is tested in a further operation by means of a pixel-by-pixel comparison. This comparison can be performed on both logics or on the downstream processors.

A threshold value can be defined for the comparison that specifies how many pixel pairs can deviate from a defined expected comparison value. The threshold value defines whether the pixel pair delivers the same values or not and what is to be regarded a's equal or unequal. In addition, the number of unequal pairs can be used as a decision parameter.

If the defined threshold value is exceeded on at least one processor, at least one of the processors generates a fail signal at the output.

Comparison of the depth images A and B already adds up several comparison functions. These include pixel sensitivity, gate functions (integration/accumulation), read-out, ADC, and logic operations.

Validity of the full functionality of the pixel matrix can also be achieved by a pixel-by-pixel comparison of an amplitude image.

Figure 23:
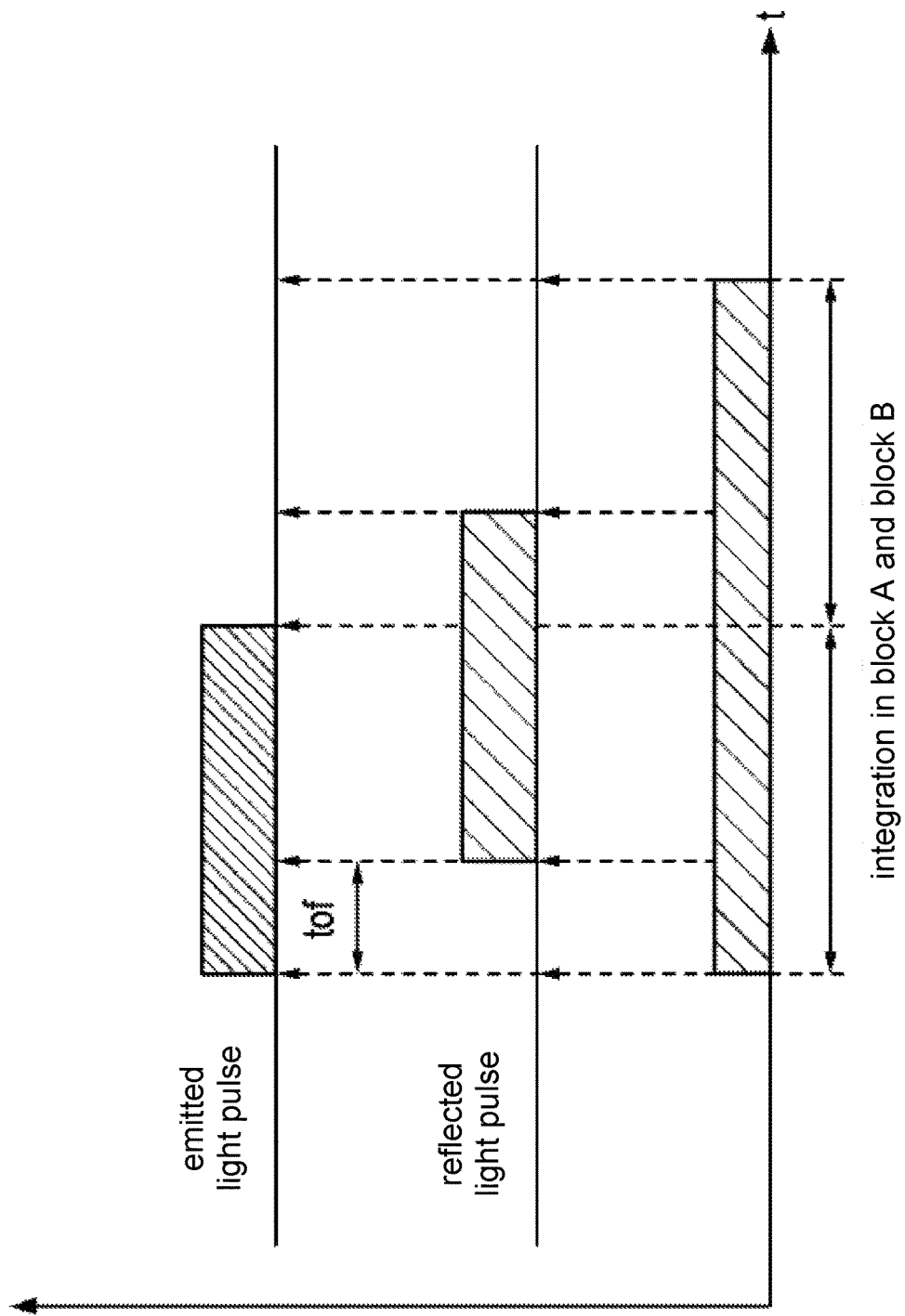
FIG. 23: illustrates that testing of the function of the pixel matrix can be carried out on the block level in exactly the same way as on the pixel level (cf.
Figure 24:
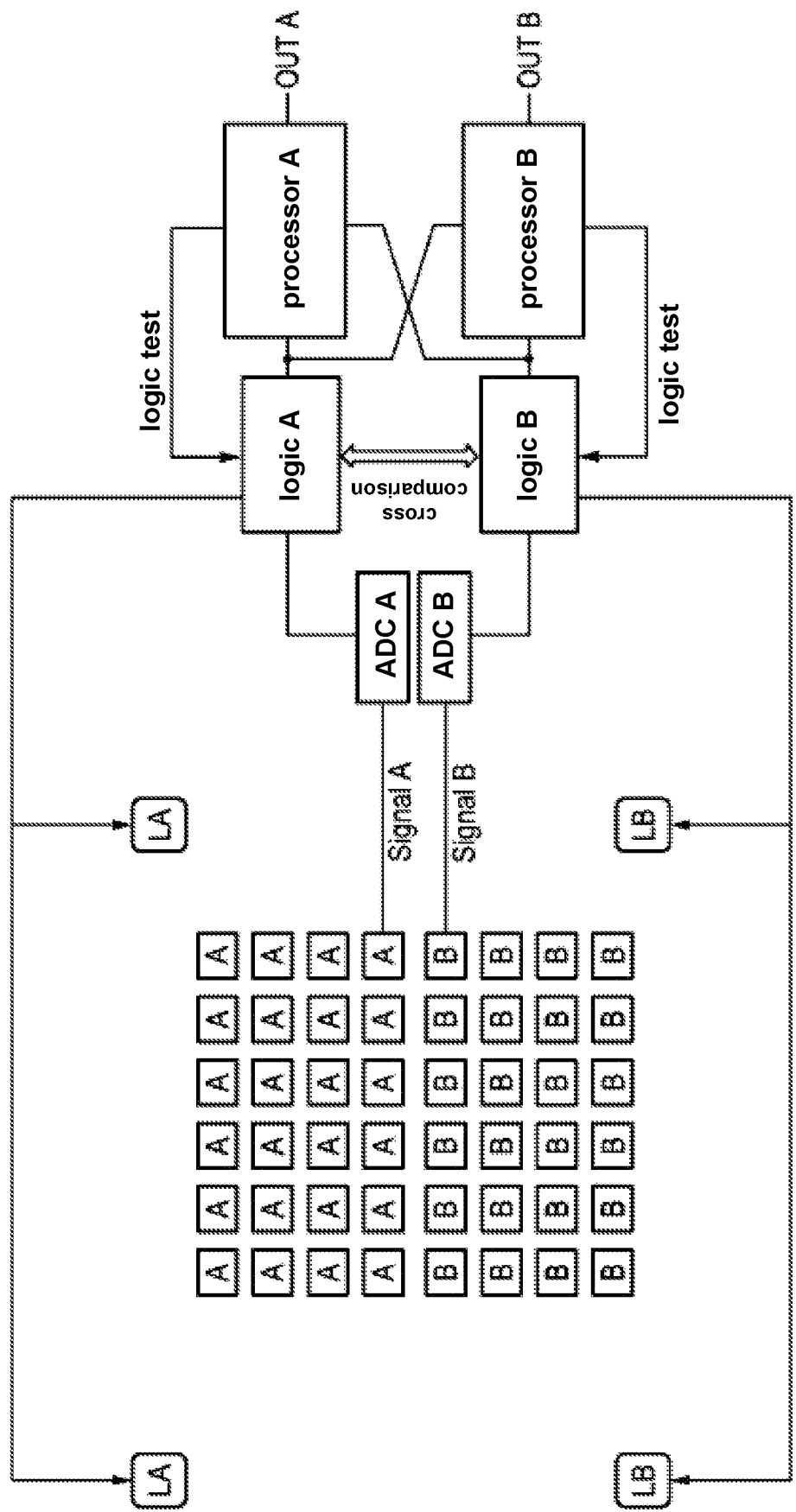
FIG. 24: shows an image processing circuit for reading out a pixel matrix that is divided into two blocks A and B.

Testing the Function of the Pixel Matrix in the 2D Amplitude Image:

Just like on the pixel level (see above and FIGS. 8 and 9), testing the function of the pixel matrix in the 2D amplitude image can also be performed at the block level; see FIGS. 23 and 24. This is achieved by simultaneous scanning of the reflected light pulse in both block A and block B. In this case as well, the cycle of sending and scanning the reflected light pulse must be repeated several times until a sufficient charge quantity is accumulated in the memories of the pixels in Block A and Block B.

After completion of the accumulation cycle, the images in blocks A and B are read out and compared pixel by pixel on both logics. The comparison values can be evaluated both in the logic and in the downstream processors.

A threshold value can be defined for the comparison that determines whether the pixels should be considered to be equal or unequal. In addition, it can be defined how many pixels pairs can deviate from each other (not be equal) by a defined range before the fail signal is generated. If the defined threshold value is exceeded on at least one channel, at least one of the processors generates a fail signal at the output.

Testing the Light Sources:

The described test cycle is also suitable for testing the light sources. A total of 4 light sources are used in the exemplary embodiment, of which two are respectively controlled by the logic of channel A or Channel B.

The light sources can now be tested using either the sources of channel A or the sources of channel B in each test cycle.

Unlike comparing the receiver signal values by means of a cross comparison, the light sources are compared by means of a serial comparison in the respective channel.

In the present exemplary embodiment, the test is performed as follows:

1. Starting a light pulse with twice the length as compared to recording of (the depth image (e. g. 60 ns) of the light source of channel A.
2. Simultaneously starting the global shutters in both blocks A and B with twice the length of the light pulse (e. g. 120 ns).
3. Saving the images of block A (image A0) and block B (image B0) in the logic blocks of the respective channels.
4. Starting a light pulse with twice the length as compared to recording of the depth image (e. g. 60 ns) of the light source of channel B.
5. Simultaneously starting the global shutters in both blocks A and B with twice the length of the light pulse (e. g. 120 ns).
6. Saving the images of block A (image A1) and block B (image B1) in the logic blocks of the respective channels.

7. Each pixel value A(i,j) from the sub-matrix A and each pixel B(i,j) from the sub-matrix B during exposure to the LA source is compared with the corresponding values from the exposure to the LB source. A maximum difference value is defined. If this value is exceeded, there is a defect and a fail signal can be generated. It is also conceivable to generate the fail signal only if the difference value is exceeded for a predetermined number of pixels pairs. The comparison values can be evaluated both in the logic and in the downstream processors.

The invention is explained using a second exemplary embodiment.

Just like in the first embodiment, the image field, which preferably has a very high resolution, e. g. 1280×1024 pixels, is divided into blocks according to the created read-out channels. Unlike the first exemplary, embodiment, each read-out block is subdivided again, which means that each read-out block operates with two global shutters that can be released separately.

Each sub-block (Aa, Ab, Ba, Bb) is also assigned its own imaging optics. The distance between the now four optics is very small so that parallax is no longer resolved even at a small object distance on the image side. This means that the same image of the object side is generated on each sub-block.

This arrangement of optics and imager is used in a parallelized read-out and image processing circuit according to FIG. 24.

Calculation of a Depth Image:

The exemplary embodiment is still based on a two-channel set-up. However, the image recorder (imager) is now divided into block Aa and Ab and block Ba and Bb. In the present exemplary embodiment, each block has 640×512 pixels. The digital read-out channels for block A and block B are routed to the corresponding logics A and B.

Logics A and B control the respective global shutter signals and accordingly also the lights LA and LB. The light sources are operated synchronously.

While the first exemplary embodiment describes signal scanning with two integration periods (2 phases), the signal is now scanned four times, with the scanning points being offset by ¼ of the signal period.

Figure 1:
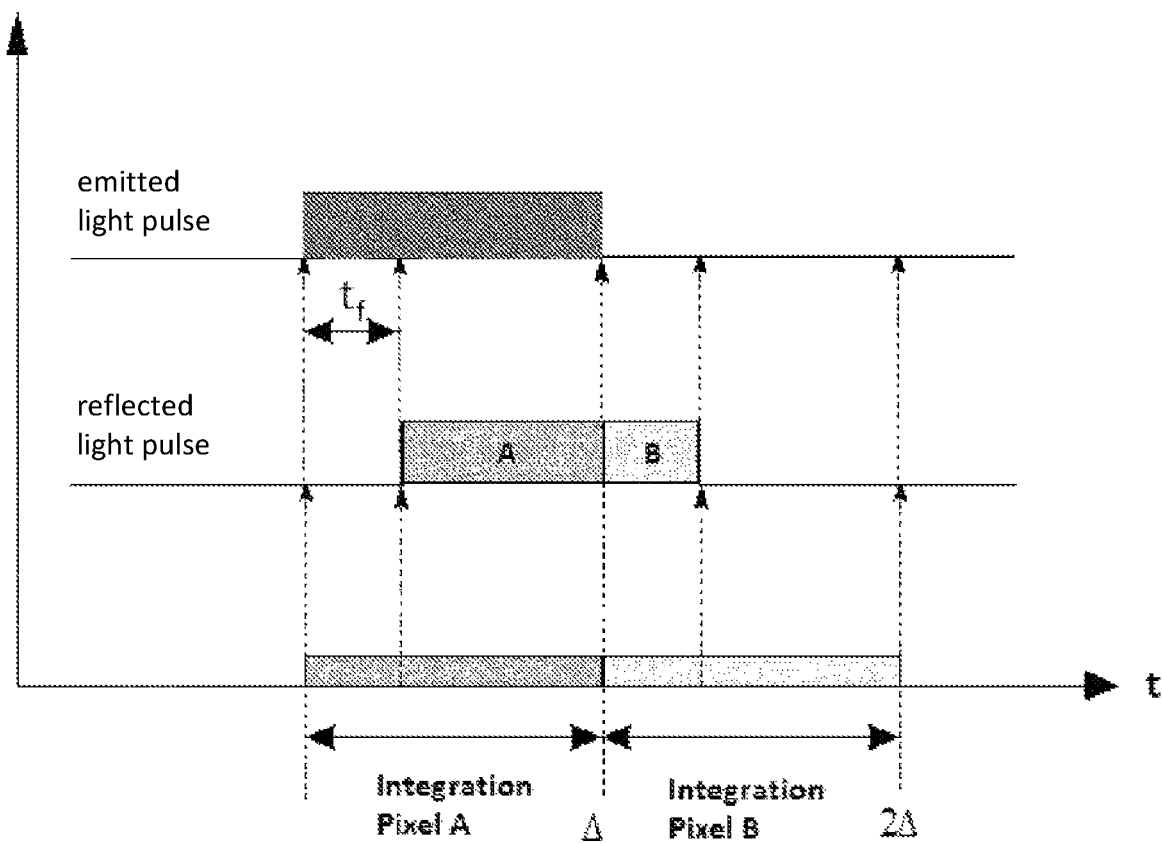
FIG. 1: illustrates the distance measurement according to the TOF principle, which is based on a time-of-flight measurement for an emitted light pulse (emitted pulse)
Figure 2:
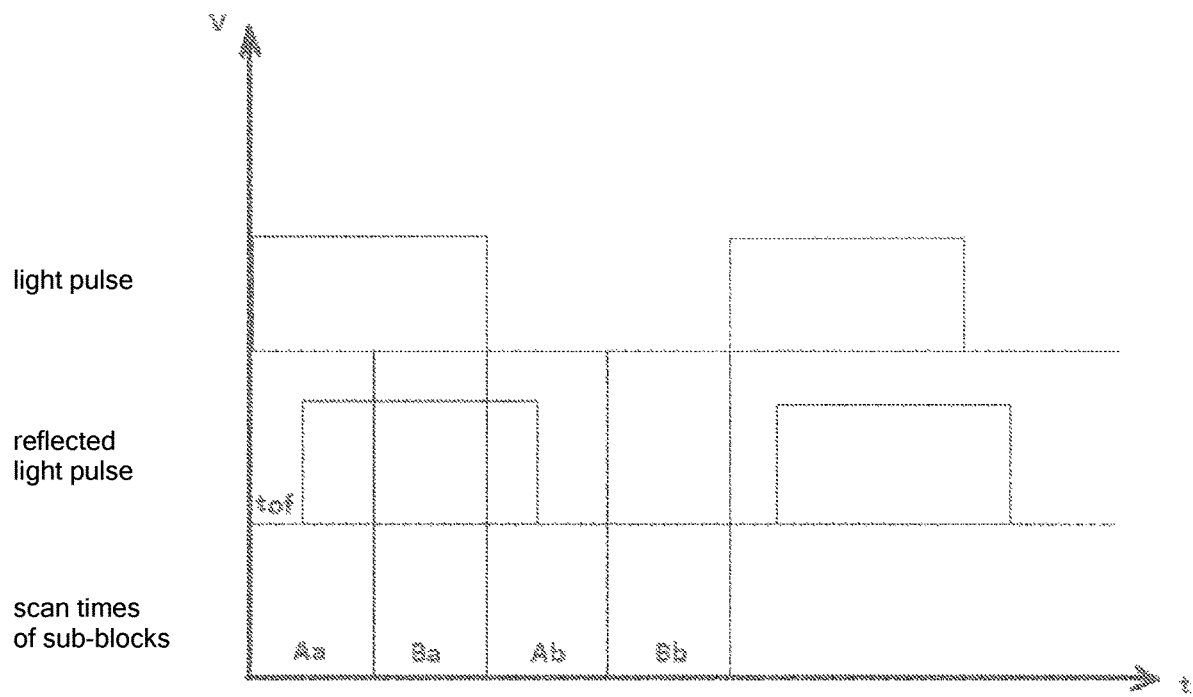
FIG. 2: illustrates a transit time measurement similar to that in FIG. 1 with four-phase scanning of the reflected light pulse.

With regard to the exemplary embodiment with a light pulse of 30 ns in length, this would result in a scanning sequence that could be described as follows: sub-block Aa from 0 to 30 ns, for sub-block Ba 30 ns to 60 ns, for sub-block Ab 60 ns to 90 ns, and for sub-block Bb 90 ns to 120 ns; see also FIG. 2.

The depicted relationships also apply if a sinusoidal form is selected as the periodic signal.

Since the reflected signals can be very weak depending on the reflectance of the target and the distance, it is necessary to provide the amplification mechanism already described above. This is achieved by repeating the measurement multiple times and accumulating the respectively registered charge quantity in the associated storage capacities of the pixels in the sub-blocks until a sufficient signal level is reached. This process can be repeated 100 times, for example.

As a result, there is one image for each quarter of the period in the storage capacities of the pixels of the sub-blocks. Based on this, the phase and thus the distance S per pixel can be calculated using the following rule.

$\varphi = \tan^{-1}[(Ba-Bb)/(Aa-Ab)]$ $S = (\varphi \cdot T)/(2\pi)$

T—is the period of the periodic signal in this case.

Strictly speaking, calculation of the phase angle only applies to sinusoidal signals. Respective corrections for high linearity of the distance characteristic need to be applied in the case of square wave signals. One option for improving the linearity of the distance characteristic in 4-phase scanning can be achieved, inter alia, by scanning with T/2.

The test procedures described in the first exemplary embodiment are performed in exactly the same way.

Figure 26:
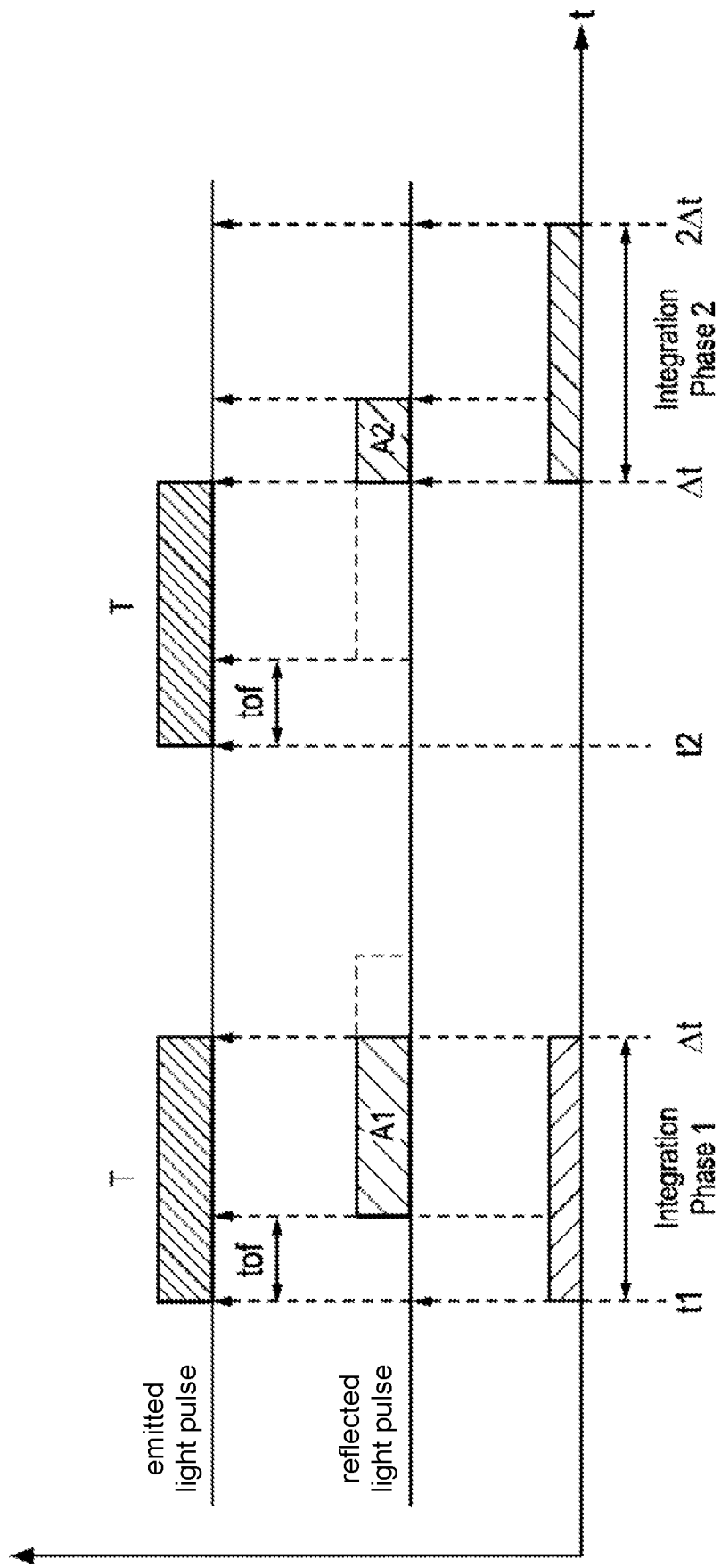
FIG. 26: illustrates the serial scanning of the reflected light pulse by means of an image sensor that has only a single global shutter.

In the following, we will explain a third exemplary embodiment that is shown in FIG. 26.

In contrast to the previous examples, we only have one global shutter available for the entire pixel matrix. While two global shutters were used for the phases of the depth image in the previous exemplary embodiments (see FIGS. 1, 8, 11 and 23) so that two phase images can be recorded at the same time (in parallel), the exemplary embodiment shown in FIG. 26 is based on one image recorder with only a single global shutter. In this case, the two phase images have to be recorded one after the other (serially), as illustrated in FIG. 26. Other than that, the same optical set-up as in the first exemplary embodiment can be arranged. The pixel matrix is divided into two blocks A and B along the two read-out channels. Each block is assigned its own imaging optics. The distance between the two optics is very small so that parallax is no longer resolved even at a small object distance on the image side. This means that the same image of the object side is generated on each block.

In contrast to the first exemplary embodiment, each block is additionally provided with an optical filter or a system of filters. The filter or filter system limits the transmitted wavelength of each block to a narrow spectral band that respectively corresponds to the source wavelength of the associated light source; see FIG. 25.

Figure 25:
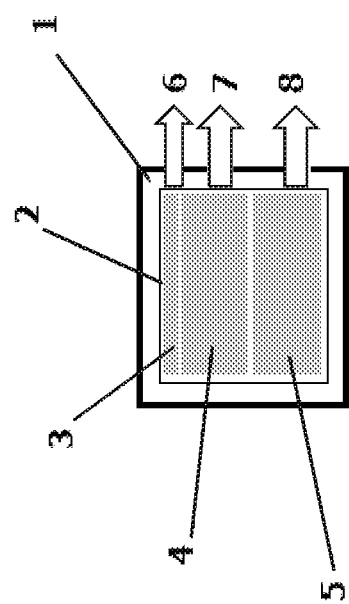
FIG. 25: shows an image sensor similar to that in FIG. 22, for which an additional optical channel is provided.

The exemplary embodiment in FIG. 25 differs from that in FIG. 22 in that it has an additional optical channel 3 and an additional read-out channel 6. In detail, FIG. 25 shows the following:

1—image recorder
2—optically sensitive surface
3—additional optical channel
4—imager block A with spectral filter A
5—imager block B with spectral filter B
6—additional read-out channel
7—read-out channel for imager block A
8—readout channel for imager block B.

For all embodiments shown, the following applies: The respective 3D TOF sensor can be designed to save the signal step of testing the first transmitter group in that the transmitter groups operate in at least two different wavelength ranges (which may overlap) and the pixel matrix is structured in such a way that pixel A and pixel B (or block A and block B) are set to one of the two different wavelength ranges by a corresponding optical filter, with the respective optical filter only allowing one of the two wavelength ranges to pass. Using the wavelength 850 nm for the first transmitter group and the pixels of channel A and 940 nm for the second transmitter group and the pixels of channel B constitutes a particularly preferred solution.

The invention claimed is:

1. A 3D TOF sensor with at least one pixel matrix that has a pixel structure divided into at least two signal paths (channels A and B), wherein the signal paths are routed in such a way that signal propagation times are identical for both signal paths according to a pixel localization and wherein each signal path has its own independent analog signal output (signal A and signal B), wherein the 3D TOF sensor also has at least two optical transmitter groups, of which each transmitter group contains at least one transmitter, and wherein the optically sensitive areas of pixels of the first signal path (pixels A) and the pixels of the second signal path (pixels B) are optically connected in pairs by optical binning in such a way that one pixel from channel A (pixel A) and one pixel from channel B (pixel B) absorb the same amount of light and wherein the signal paths of the pixel groups, each comprising a pixel A and a pixel B, are not electrically connected to one another.

2. The 3D TOF sensor according to claim 1, wherein the transmitters operate in the infrared spectral range.

3. The 3D TOF sensor according to claim 1, wherein a separate logic of signal path A and signal path B for controlling and processing the signal values originating from the pixels of the corresponding signal path is provided for each signal path of the pixel matrix.

4. The 3D TOF sensor according to claim 3, wherein the logic of each signal path is designed to determine amplitudes and distance values by processing the signal values of both signal paths in such a way that the signal values are exchanged crosswise.

5. The 3D TOF sensor according to claim 3, the pixel structure further comprising a plurality of pixels A connected to channel A and a plurality of pixels B connected to channel B, wherein optically sensitive surfaces of the pixels of the first channel (pixels A) and of the pixels of the second channel (pixels B) are connected by means of a diffuser that distributes an amount of light evenly across optical surfaces of respectively one pixel from channel A (pixel A) and one pixel from channel B (pixel B).

6. The 3D TOF sensor according to claim 1, further comprising a comparator step designed to compare the signal values present in parallel at outputs of the pixel matrix with each other and/or with a default value as comparator threshold value.

7. The 3D TOF sensor according to claim 3, further comprising two analog-to-digital converters that are designed to digitize analog signal values A and B in the respective signal path A or signal path B and that are respectively connected to the logic of signal path A or the logic of signal path B.

8. The 3D TOF sensor according to claim 1, wherein the 3D TOF sensor is designed to test a functionality of photo receivers by comparing the signal values A and the signal values B in an additional special signal processing step; it does so by activating the pixels A and the pixels B at the same time the transmitters are started.

9. The 3D TOF sensor according to claim 1, wherein the 3D TOF sensor is designed to test a functionality of the transmitters by a further additional signal step; and does so by activating either the pixels A or the pixels B at the same time the transmitters in only one transmitter group are started.

10. The 3D TOF sensor according to claim 1, wherein each signal path comprises a processor which is connected to the signal path of the logic of the channel, wherein calculated amplitudes and distance values, which were transmitted by the respective logic, are transmitted to each processor.

11. The 3D TOF sensor according to claim 10, wherein one of the processors is a safety-related processor that has at least two independent reactionless computing cores and processes two inputs on one output (1oo2—one out of two).

12. A 3D TOF sensor with an image sensor that comprises an image recorder with a pixel matrix, wherein the image recorder can read out image data in individual, at least two, separate independent blocks of the pixel matrix and transfer the image data in at least two separate signal paths, the pixels of the pixel matrix of the image recorder comprise at least one photosensitive receiver and a memory cell for storing charge carriers, and the signal paths have an analog-to-digital converter, a programmable logic, memory cells and a processor connected to them, wherein the image recorder comprises at least one global shutter for all blocks that can be released by a control signal of the programmable logic and can set a minimum shutter time of less than 100 ns, and the signal paths are wired independently and reactionlessly from each other, and the signal paths are wired such that the data of the logics or the processors can be exchanged crosswise, wherein each block of the image sensor is assigned its own imaging optics in such a way that the same image of the object side is imaged on the at least two separate independent blocks of the pixel matrix.

13. The 3D TOF sensor according to claim 12, wherein at least one light source is assigned to each block, which is synchronized with the global shutter via the logic.

14. The 3D TOF sensor according to claim 12, wherein the image sensor features a separate global shutter in each block that can be controlled by the logic of assigned signal paths.

* * * * *